(12) United States Patent
Duan et al.

(10) Patent No.: US 12,432,682 B2
(45) Date of Patent: Sep. 30, 2025

(54) POSITIONING AIDED NEW RADIO RACE PROCEDURE

(71) Applicant: QUALCOMM Incorporated, San Diego, CA (US)

(72) Inventors: Weimin Duan, San Diego, CA (US); Jing Lei, San Diego, CA (US); Huilin Xu, Temecula, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/907,938

(22) PCT Filed: Apr. 8, 2021

(86) PCT No.: PCT/US2021/026447
§ 371 (c)(1),
(2) Date: Aug. 29, 2022

(87) PCT Pub. No.: WO2021/207538
PCT Pub. Date: Oct. 14, 2021

(65) Prior Publication Data
US 2023/0164846 A1   May 25, 2023

(30) Foreign Application Priority Data
Apr. 8, 2020   (GR) .............................. 20200100181

(51) Int. Cl.
*H04W 74/0833*   (2024.01)
*H04W 64/00*   (2009.01)

(52) U.S. Cl.
CPC ....... *H04W 74/0833* (2013.01); *H04W 64/00* (2013.01)

(58) Field of Classification Search
None
See application file for complete search history.

(56) References Cited

U.S. PATENT DOCUMENTS

2014/0112254 A1* 4/2014 Lindoff ............... H04W 74/002
370/328
2017/0142756 A1* 5/2017 Lee ...................... H04W 76/45
(Continued)

FOREIGN PATENT DOCUMENTS

CN        109845378 A      6/2019
WO    WO-2018175809 A1    9/2018
(Continued)

OTHER PUBLICATIONS

International Search Report and Written Opinion—PCT/US2021/026447—ISA/EPO—Jul. 21, 2021.

*Primary Examiner* — Faiyazkhan Ghafoerkhan
(74) *Attorney, Agent, or Firm* — Harrity & Harrity, LLP

(57) ABSTRACT

Various aspects of the present disclosure generally relate to wireless communication. In some aspects, a user equipment may transmit, to a base station, an indication of a selected random access channel (RACH) procedure that is selected based at least in part on positioning state information (PSI) associated with the UE, wherein the PSI is based at least in part on one or more positioning measurements obtained by the UE; and receive, from the base station, a configuration of resources for the selected RACH procedure. Numerous other aspects are provided.

30 Claims, 8 Drawing Sheets

(56) References Cited

U.S. PATENT DOCUMENTS

| | | | |
|---|---|---|---|
| 2017/0251456 A1* | 8/2017 | Radulescu | H04W 74/0833 |
| 2018/0205516 A1* | 7/2018 | Jung | H04W 74/0836 |
| 2018/0324850 A1* | 11/2018 | Amuru | H04J 11/0079 |
| 2018/0324853 A1* | 11/2018 | Jeon | H04W 74/006 |
| 2019/0254074 A1* | 8/2019 | Jeon | H04W 36/0085 |
| 2019/0261411 A1* | 8/2019 | Chin | H04W 74/0833 |
| 2019/0320430 A1* | 10/2019 | Kim | H04L 27/26132 |
| 2019/0320467 A1* | 10/2019 | Freda | H04W 74/004 |
| 2019/0342912 A1 | 11/2019 | Priyanto et al. | |
| 2023/0164846 A1* | 5/2023 | Duan | H04W 64/00 370/329 |

FOREIGN PATENT DOCUMENTS

| | | |
|---|---|---|
| WO | 2019033027 | 2/2019 |
| WO | WO-2019086309 A1 | 5/2019 |

* cited by examiner

POSITIONING AIDED NEW RADIO RACE PROCEDURE

CROSS-REFERENCE TO RELATED APPLICATIONS

This Patent Application is a 371 national stage of PCT Application No. PCT/US2021/026447 filed on Apr. 8, 2021, entitled "POSITIONING AIDED NEW RADIO RACE PROCEDURE," which claims priority to Greece Patent Application Serial No. 20200100181, filed on Apr. 8, 2020, entitled "POSITIONING AIDED NEW RADIO RACE PROCEDURE," and assigned to the assignee hereof. The disclosure of the prior Applications are considered part of and is are incorporated by reference into this Patent Application.

FIELD OF THE DISCLOSURE

Aspects of the present disclosure generally relate to wireless communication and to techniques and apparatuses for a positioning aided New Radio procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include transmitting, to a base station, an indication of a selected random access channel (RACH) procedure that is selected based at least in part on positioning state information (PSI) associated with the UE, wherein the PSI is based at least in part on one or more positioning measurements obtained by the UE; and receiving, from the base station, a configuration of resources for the selected RACH procedure.

In some aspects, a method of wireless communication, performed by a base station, may include receiving, from a UE, an indication of a selected RACH procedure that is based at least in part on PSI associated with the UE, wherein the PSI is based at least in part on one or more positioning measurements obtained by the UE; and transmitting, to the UE, a configuration of resources for the selected RACH procedure.

In some aspects, a UE for wireless communication may include a memory and one or more processors coupled to the memory. The memory and the one or more processors may be configured to transmit, to a base station, an indication of a selected RACH procedure that is selected based at least in part on PSI associated with the UE, wherein the PSI is based at least in part on one or more positioning measurements obtained by the UE; and receive, from the base station, a configuration of resources for the selected RACH procedure.

In some aspects, a base station for wireless communication may include a memory and one or more processors coupled to the memory. The memory and the one or more processors may be configured to receive, from a UE, an indication of a selected RACH procedure that is based at least in part on PSI associated with the UE, wherein the PSI is based at least in part on one or more positioning measurements obtained by the UE; and transmit, to the UE, a configuration of resources for the selected RACH procedure.

In some aspects, a non-transitory computer-readable medium may store one or more instructions for wireless communication. The one or more instructions, when executed by one or more processors of a UE, may cause the one or more processors to transmit, to a base station, an indication of a selected RACH procedure that is selected based at least in part on PSI associated with the UE, wherein the PSI is based at least in part on one or more positioning measurements obtained by the UE; and receive, from the base station, a configuration of resources for the selected RACH procedure.

In some aspects, a non-transitory computer-readable medium may store one or more instructions for wireless communication. The one or more instructions, when executed by one or more processors of a base station, may cause the one or more processors to receive, from a UE, an indication of a selected RACH procedure that is based at least in part on PSI associated with the UE, wherein the PSI is based at least in part on one or more positioning measurements obtained by the UE; and transmit, to the UE, a configuration of resources for the selected RACH procedure.

In some aspects, an apparatus for wireless communication may include means for transmitting, to a base station, an indication of a RACH procedure that is selected based at least in part on PSI associated with the apparatus, wherein the PSI is based at least in part on one or more positioning measurements obtained by the apparatus; and means for receiving, from the base station, a configuration of resources for the selected RACH procedure.

In some aspects, an apparatus for wireless communication may include means for receiving, from a UE, an indication of a selected RACH procedure that is based at least in part on PSI associated with the UE, wherein the PSI is based at least in part on one or more positioning measurements obtained by the UE; and means for transmitting, to the UE, a configuration of resources for the selected RACH procedure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
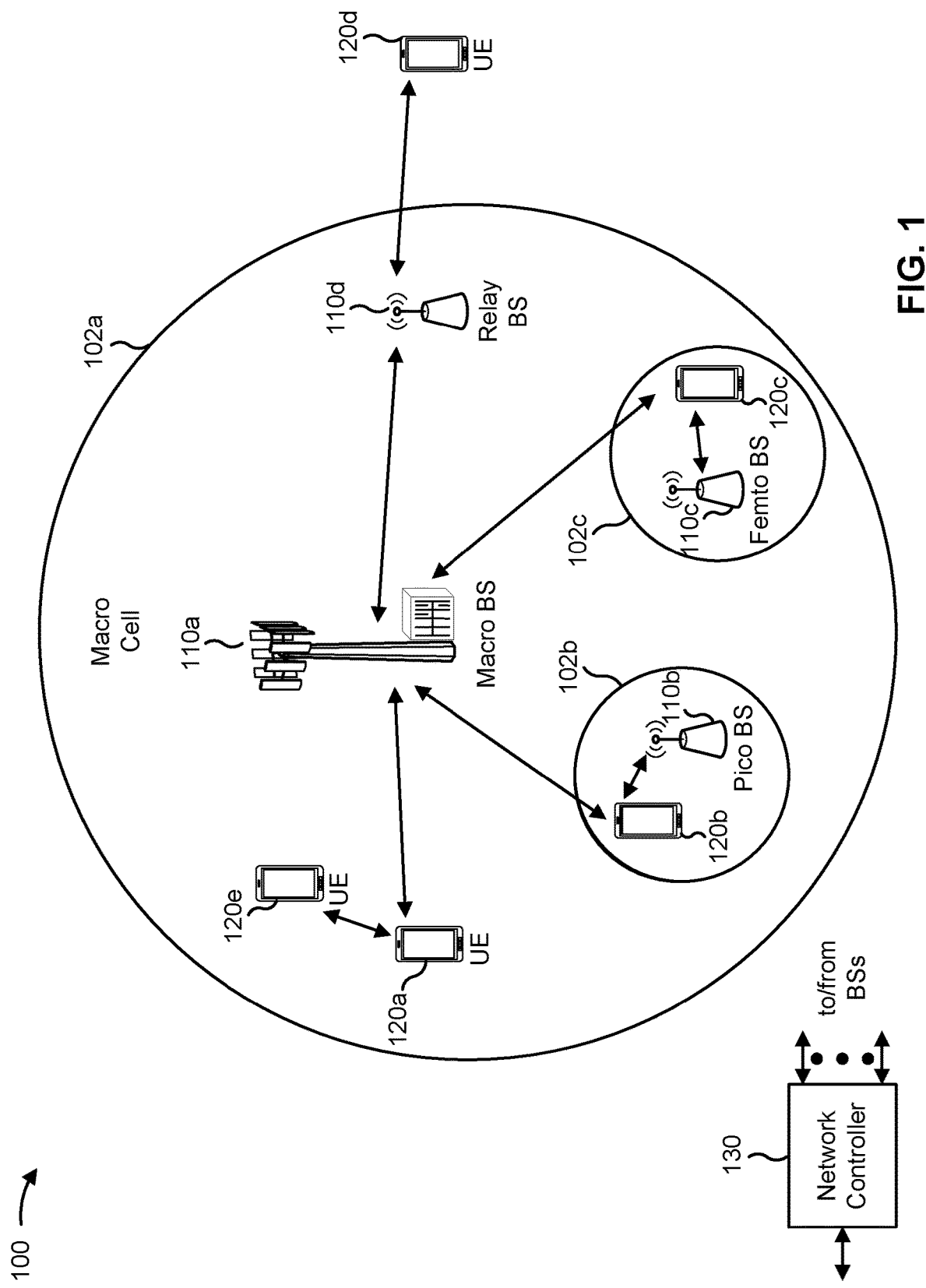
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
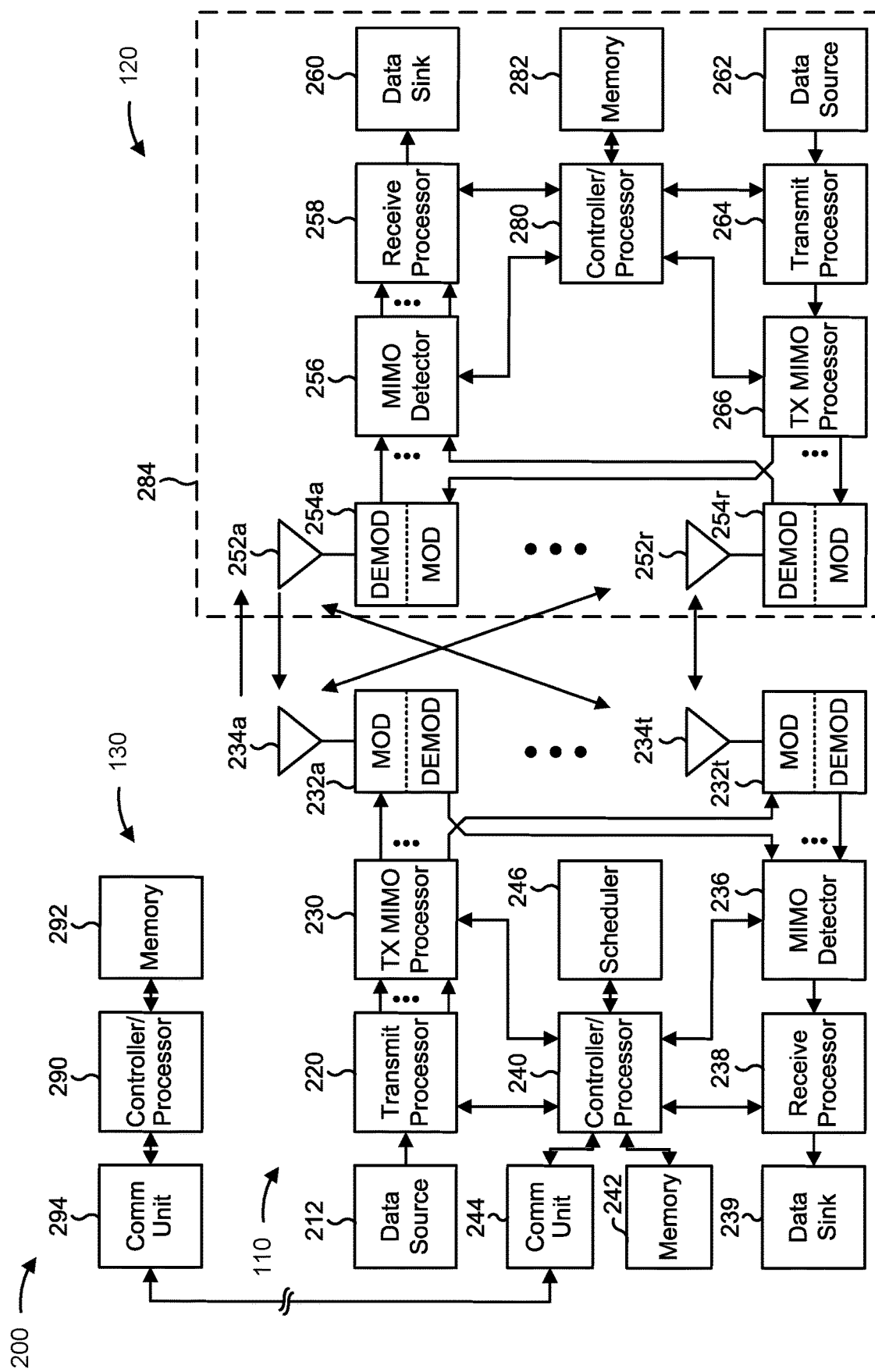
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-8).

Controller/processor 240 of base station 110, controller/processor 280 of UE 120, and/or any other component(s) of FIG. 2 may perform one or more techniques associated with a positioning aided NR RACH procedure, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for transmitting, to a base station, an indication of a selected random access channel (RACH) procedure that is selected based at least in part on positioning state information (PSI) associated with the UE, wherein the PSI is based at least in part on one or more positioning measurements obtained by the UE, means for receiving, from the base station, a configuration of resources for the selected RACH procedure, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, an indication of a selected RACH procedure that is based at least in part on PSI associated with the UE, wherein the PSI is based at least in part on one or more positioning measurements obtained by the UE, means for transmitting, to the UE, a configuration of resources for the selected RACH procedure, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
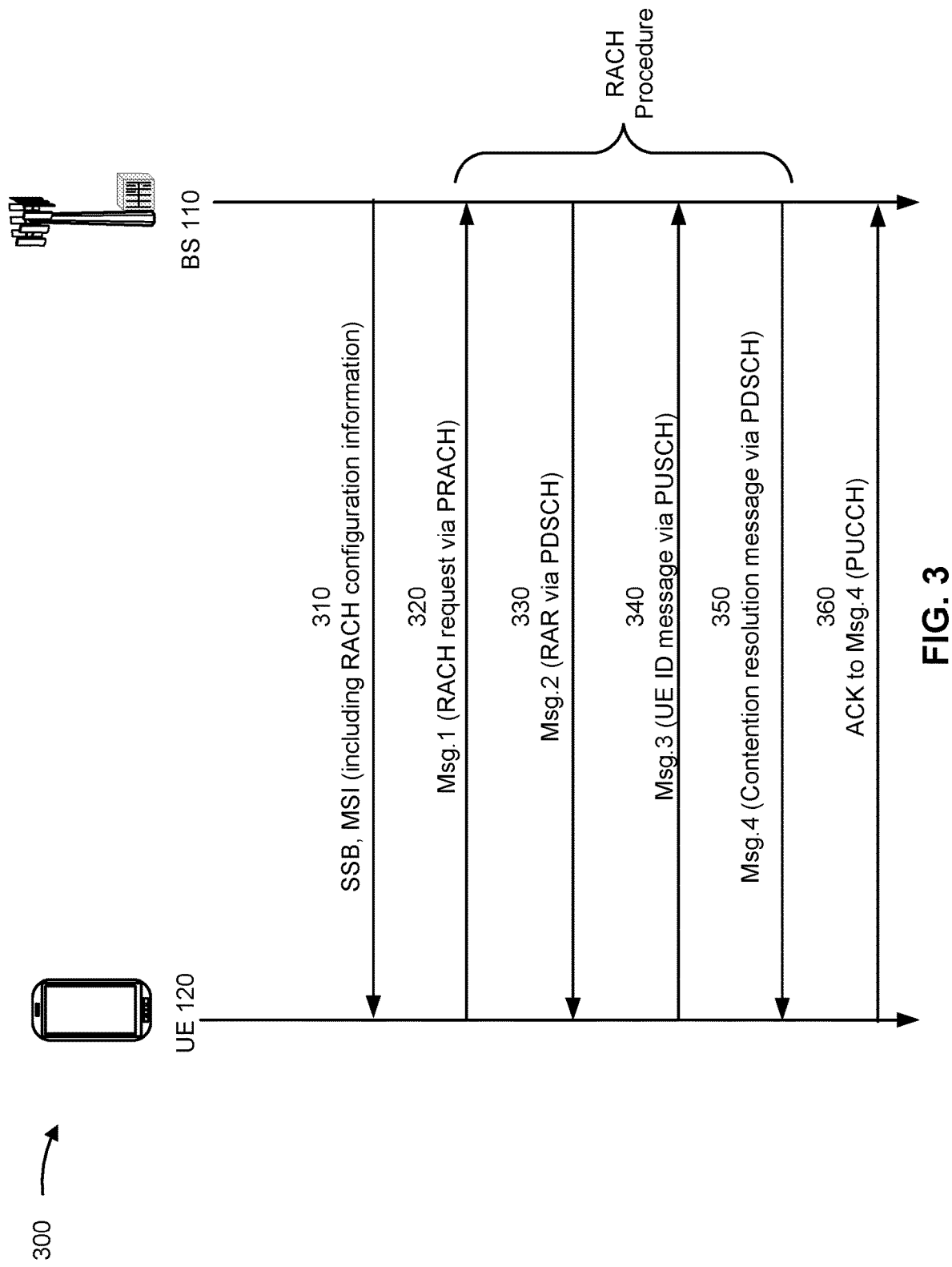
FIG. 3 is a diagram illustrating an example of a call flow for configuring an uplink bandwidth part for a four-step random access channel (RACH) procedure, in accordance with the present disclosure.

FIG. 3 is a diagram illustrating an example 300 of a call flow for configuring an uplink bandwidth part for a four-step random access channel (RACH) procedure, in accordance with the present disclosure.

As shown in FIG. 3, BS 110 and UE 120 exchange communications, including communications of a RACH procedure, based at least in part on an initial activity event occurring with UE 120. An initial activity may include UE 120 powering on, UE 120 entering a coverage area of BS 110, and/or the like. According to some aspects described herein, UE 120 and BS 110 may utilize an initial active uplink bandwidth part to perform the RACH procedure of FIG. 3. From the RACH procedure, according to some aspects herein, an uplink physical resource block (PRB) grid may be established for communication between UE 120 and BS 110. As such, the initial active uplink bandwidth part may enable UE 120 to save power resources (rather than transmitting across a wider bandwidth), ensure that UE 120 has the bandwidth capability to communicate with BS 110 (as some types of UE 120 may not have broad bandwidth capabilities), and enable BS 110 to balance the load of the bandwidth parts of the bandwidth used for communication with UE 120 (e.g., by evenly distributing communications with UEs across uplink bandwidth parts of an uplink bandwidth).

As shown by reference number 310, BS 110 transmits, and UE 120 receives, one or more synchronization signal blocks (SSBs) and some minimum system information (MSI), which includes RACH configuration information, to UE 120. For example, the MSI may include communication information for UE 120 to use to communicate with BS 110. The RACH configuration information, according to some aspects described herein, may include information associated with an initial active uplink bandwidth part for the RACH procedure of FIG. 3 to enable UE 120 and BS 110 to establish a communication link. For example, the RACH configuration information may indicate or provide instructions for identifying a PRB frequency location of the initial uplink activity bandwidth part, a bandwidth of the initial uplink activity bandwidth part, and/or a numerology of the initial uplink activity bandwidth part. Using the PRB frequency location, the bandwidth, and/or the numerology of the initial uplink activity bandwidth part, an uplink PRB grid may be established for communication between UE 120 and BS 110.

As shown in FIG. 3, a RACH procedure is performed (as illustrated by reference numbers 320-350) using an initial active uplink bandwidth part. In the RACH procedure of FIG. 3, and as shown by reference number 320, using information from the MSI, UE 120 sends a random access message (RAM) with a with a RACH request via a physical random access channel (PRACH). The RAM may include a preamble (sometimes referred to as a random access preamble, a PRACH preamble, a RAM preamble, and/or the like). The message that includes the preamble may be referred to as a message 1, msg1, Msg. 1, MSG1, a first message, an initial message, and/or the like in a four-step random access procedure. The random access message may include a random access preamble identifier.

As shown by reference number 330, BS 110 may reply to Msg. 1 with a (random access response (RAR)) via the PDSCH. The message that includes the RAR may be referred to as message 2, msg2, Msg. 2, MSG2, or a second message in a four-step random access procedure. In some aspects, the RAR may indicate the detected random access preamble identifier (e.g., received from the UE 120 in Msg. 1).

As shown by reference number 340, UE 120 sends an RRC connection request message via the PUSCH. The RRC connection request message may be referred to as message 3, msg3, Msg. 3, MSG3, a UE identification message, or a third message of a four-step random access procedure. In some aspects, the RRC connection request may include a UE identifier, UCI, a PUSCH communication (e.g., an RRC connection request), and/or the like.

As shown by reference number 350, BS 110 sends an RRC connection setup message via the PDSCH. The RRC connection setup message may be referred to as message 4, msg4, Msg. 4, MSG4, or a fourth message of a four-step random access procedure. In some aspects, the RRC connection setup message may include the detected UE identifier, a timing advance value, contention resolution information, and/or the like. After the RACH procedure, as shown by reference number 360, UE 120 may send an acknowledgement indicating that UE 120 is ready to communicate with BS 110 via an uplink PRB grid (which is used in the communication link between UE 120 and BS 110).

As indicated above, FIG. 3 is provided as an example. Other examples may differ from what is described with respect to FIG. 3.

Figure 4:
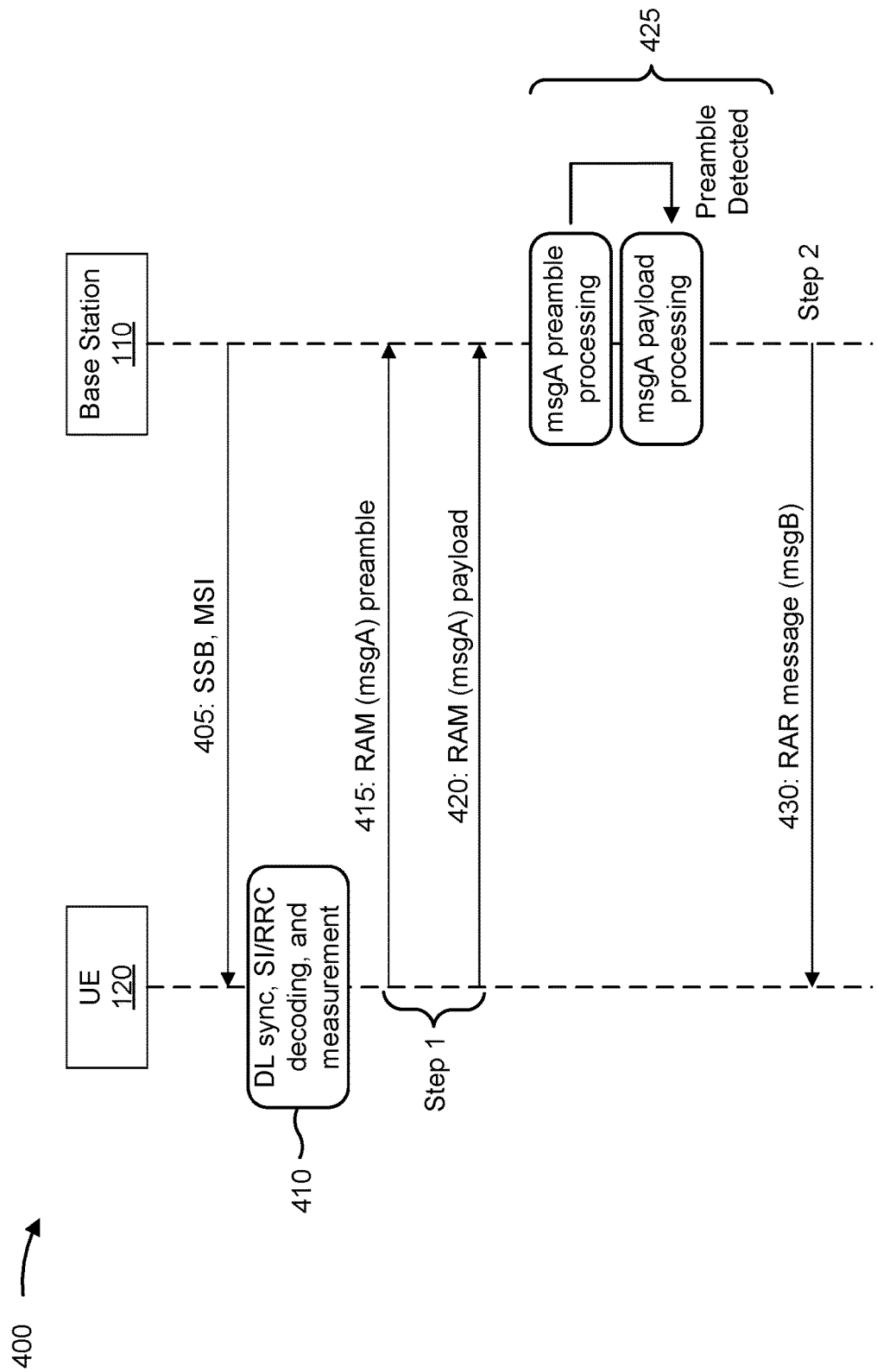
FIG. 4 is a diagram illustrating an example of a call flow for configuring an uplink bandwidth part for a two-step RACH procedure, in accordance with the present disclosure.

FIG. 4 is a diagram illustrating an example 400 of a call flow for configuring an uplink bandwidth part for a two-step RACH procedure, in accordance with the present disclosure.

As shown in FIG. 4, a base station 110 and a UE 120 may communicate with one another to perform the two-step RACH procedure.

As shown by reference number 405, the base station 110 may transmit, and the UE 120 may receive, one or more SSBs and/or MSI that includes RACH configuration information. The MSI may include, for example, one or more SIBs. The SSBs, MSI, and/or the like may include information related to one or more RACH occasion (RO) configurations, such as information related to one or more ordered preamble resources. As shown by reference number 410, the UE 120 may perform downlink (DL) synchronization (e.g., using one or more SSBs), decode system information (SI) and/or RRC configuration information included in one or more SIBs, perform one or more measurements of reference signals (RSs), and/or the like. Based at least in part on performing the second operation 410, the UE 120 may determine one or more parameters for transmitting a random access message (RAM) in the two-step RACH procedure. For example, the UE 120 may determine one or more physical random access channel (PRACH) transmission parameters to be used to transmit the RAM, may determine one or more parameters for generating a preamble of the RAM, may identify one or more uplink resources on which the RAM is to be transmitted, and/or the like.

As shown by reference number 415, the UE 120 may transmit a RAM preamble. As shown by reference number 420, the UE 120 may transmit a RAM payload. As shown, the UE 120 may transmit the RAM preamble and the RAM payload as part of a first step of the two-step RACH procedure. The RAM is sometimes referred to as message A, msgA, an uplink message, a request message, a first (or initial) message in a two-step RACH procedure, and/or the like. The RAM preamble is sometimes referred to as a message A preamble, a msgA preamble, a preamble, and/or the like. The RAM payload is sometimes referred to as a message A payload, a msgA payload, a payload, and/or the like.

In some aspects, the RAM may include some or all of the contents of message 1 (msg1) and message 3 (msg3) of a four-step RACH procedure. For example, the RAM preamble may include some or all contents of message 1 (e.g., a RACH preamble), and the RAM payload may include some or all contents of message 3. For example, in some aspects, the RAM payload may include an identifier associated with the UE 120, uplink control information, a medium access control (MAC) layer control element (e.g., a power headroom report, a buffer status report, a beam failure report, a channel state report, and/or the like), user plane data, control plane data, and/or the like. Furthermore, in some aspects, the msgA preamble and the msgA payload may be time division multiplexed (TDMed) with one another, whereby the msgA preamble and the msgA payload may be transmitted in separate symbols based at least in part on a time division multiplexing configuration.

As shown by reference number 425, the base station 110 may receive the RAM preamble transmitted by the UE 120. If the base station 110 successfully receives and decodes the RAM preamble, the base station 110 may then receive and decode the RAM payload. As shown by reference number 430, the base station 110 may transmit a random access response (RAR) message. As shown, the base station 110 may transmit the RAR message as part of a second step of the two-step RACH procedure. The RAR message is sometimes referred to as message B, msgB, a response message, a second message in a two-step RACH procedure, and/or the like.

The RAR message may include some or all of the contents of message 2 (msg2) and message 4 (msg4) of a four-step RACH procedure. For example, the RAR message may include the detected RACH preamble identifier, the detected UE identifier, a timing advance value, contention resolution information, and/or the like. In some aspects, the RAR message may include a first portion transmitted via a physical downlink control channel (PDCCH) (e.g., to include some or all of the contents of msg2 of the four-step RACH procedure) and a second portion transmitted via a physical downlink shared channel (PDSCH) (e.g., to include some or all of the contents of msg4 of the four-step RACH procedure). In some aspects, based on whether the UE 120 successfully receives and decodes the RAR message, the UE 120 may transmit hybrid automatic repeat request (HARD) feedback to the base station 110 via a physical uplink control channel (PUCCH) (e.g., an acknowledgement (ACK) to indicate that the RAR message was successfully received and decoded or a negative acknowledgement (NACK) to indicate that the RAR message was not successfully received and decoded).

The existing NR specification has been developed to support both periodical and on-demand broadcasting of SI. In existing specifications, on-demand SIB may be requested by a UE 120 using msg 1 or msg 3 of the four-step RACH. With the introduction of new use cases and UE capabilities, not all SIBs may necessarily be useful to the UE 120. For example, a BS 110 may provide network service to a premium UE 120 (which may be termed a legacy UE or a high-tier UE), an NR-Light UE (which may be termed a low-tier UE), and/or the like. Information contained in SIBS for premium UEs may not be relevant to NR-Light UEs.

"Premium UE" may refer to a UE that is associated with a receive bandwidth capability in receiving downlink signals/channels that is above a particular threshold (for example, a bandwidth of greater than or equal to 100 megahertz (MHz)). In contrast, "NR-Light UE" may refer to a UE with a bandwidth capability in receiving the downlink signals/channels that is below a particular threshold (for example, a bandwidth of less than 10 MHz, less than 5 MHz, and/or the like). NR-Light UEs may include wearable devices, Internet of Things (IoT) devices, sensors, cameras, and/or the like that are associated with a limited bandwidth, power capacity, transmission range, and/or the like.

Various aspects of the techniques and apparatuses described herein may include providing dedicated SIBs that include information relevant to the UE categories (e.g., premium, NR-Light, and/or the like) to which the dedicated SIBs are directed. In some aspects, SI that may previously have been available through always-on (periodical) broadcasting may be made available upon request as on-demand SI. In some aspects, a BS may utilize msg 2 of four-step RACH, msg 4 of four-step RACH, MSI, msg B of two-step RACH, and/or the like for indicating dedicated on-demand SIBs. These techniques may facilitate reducing signaling overhead of always-on broadcasting. In some aspects, UEs may be able to use msg 1 of four-step RACH, an ACK for msg 4 of four-step RACH, msg A of two-step RACH, an ACK of msg B of two-step RACH, a medium access control (MAC) control element (CE), uplink control information (UCI), and/or the like for requesting on-demand SIBs. Aspects such as these may facilitate reducing the monitoring occasions of PDCCH, improve co-existence of UEs with different capabilities, and/or the like.

As indicated above, FIG. 4 is provided as an example. Other examples may differ from what is described with respect to FIG. 4.

An NR system may include two categories of RACH: contention based random access (CBRA) and contention free random access (CFRA). In a CBRA procedure, the UE 120 is configured with time domain resources, frequency domain resources, and a pool of sequences for CBRA. In the CBRA procedure, the UE 120 performs a RACH procedure by selecting a sequence from the pool and transmitting the selected sequence in the time domain resources and the frequency domain resources (e.g., on one or more beams). The pool of sequences for CBRA is shared with other UEs 120 and, as a result, a RACH collision between multiple UEs 120 is possible. Additionally, many UEs 120 may use CBRA for RACH at or near the same time. Thus, latency associated with CBRA may be higher than latency associated with CFRA. The high latency of CBRA may not satisfy requirements for some use cases, scenarios, and/or the like.

In a CFRA procedure, the UE 120 is configured with time domain resources, frequency domain resources, and a UE-specific dedicated preamble sequence for CFRA. The dedicated preamble may be configured using either RRC signaling, Layer 1 signaling (downlink control information (DCI) on the PDCCH), and/or the like. In the CFRA procedure, the UE 120 performs a RACH procedure by transmitting the sequence in the time domain resources and the frequency domain resources (e. g., on one or more beams). To initiate the CFRA procedure, the UE should be in Connected Mode before the RACH process. A number of procedures may support CFRA such as, for example, handover, PDCCH order, on-demand system information request, beam failure recovery, synchronization reconfiguration, establish time alignment during secondary cell addition, and/or the like. Because of the dedicated preamble sequence and the design of the procedure, CFRA may have lower latency than CBRA and avoid RACH collisions between UEs.

CFRA may be used in cases where RACH is more urgent than other cases. For example, high-speed UEs may benefit from a prioritized handover procedure, as the high-speed UEs move quickly from cell to cell, to avoid connection disruption. In contrast, low-speed and/or static UEs may be able to tolerate longer latency during handover. Typically, a base station 110 cannot predict the priority that should be given to a RACH procedure for a given UE 120, and it is up to the UE 120 to indicate the priority of RACH.

New technologies in the development of NR may enable precise positioning information associated with UEs. These may include high bandwidth, massive MIMO, and/or the like. Performance targets for NR positioning radio-layer solutions include horizontal positioning errors of less than 3 meters and vertical positioning errors of less than 3 meters for 80% of UEs in indoor deployment scenarios, and horizontal positioning errors of less than 10 meters and vertical positioning errors of less than 3 meters for 80% of UEs in outdoor deployment scenarios.

Aspects of techniques and apparatuses described herein may facilitate using positioning state information (PSI) associated with a UE 120 to configure prioritized RACH procedures. In this way, a base station may use PSI to optimize system performance of RACH, which may allow for lower latency, higher throughput, and increased conservation of resources. In some aspects, a UE may obtain positioning measurements. The positioning measurements may be used, by the UE and/or a base station, to determine PSI. The UE may select a RACH procedure based at least in part on the PSI and may indicate the RACH procedure to the base station. The selected RACH procedure may include a two-step CBRA procedure, a four-step CBRA procedure, a two-step CFRA procedure, or a four-step CFRA procedure.

In some aspects, the UE may provide a PSI report to the base station. In this way, for example, the base station may configure a RACH procedure to support a prioritized handover for high-speed UEs. The handover may be configured by allocating dedicated RACH resources for CFRA, whereas lower-speed UEs may be allocated shared resources to attempt CBRA. In this way, latency for UEs that need more urgent RACH procedures may be reduced, while dedicated RACH resources may be conserved by configuring UEs that need less urgent RACH procedures with shared resources.

Figure 5:
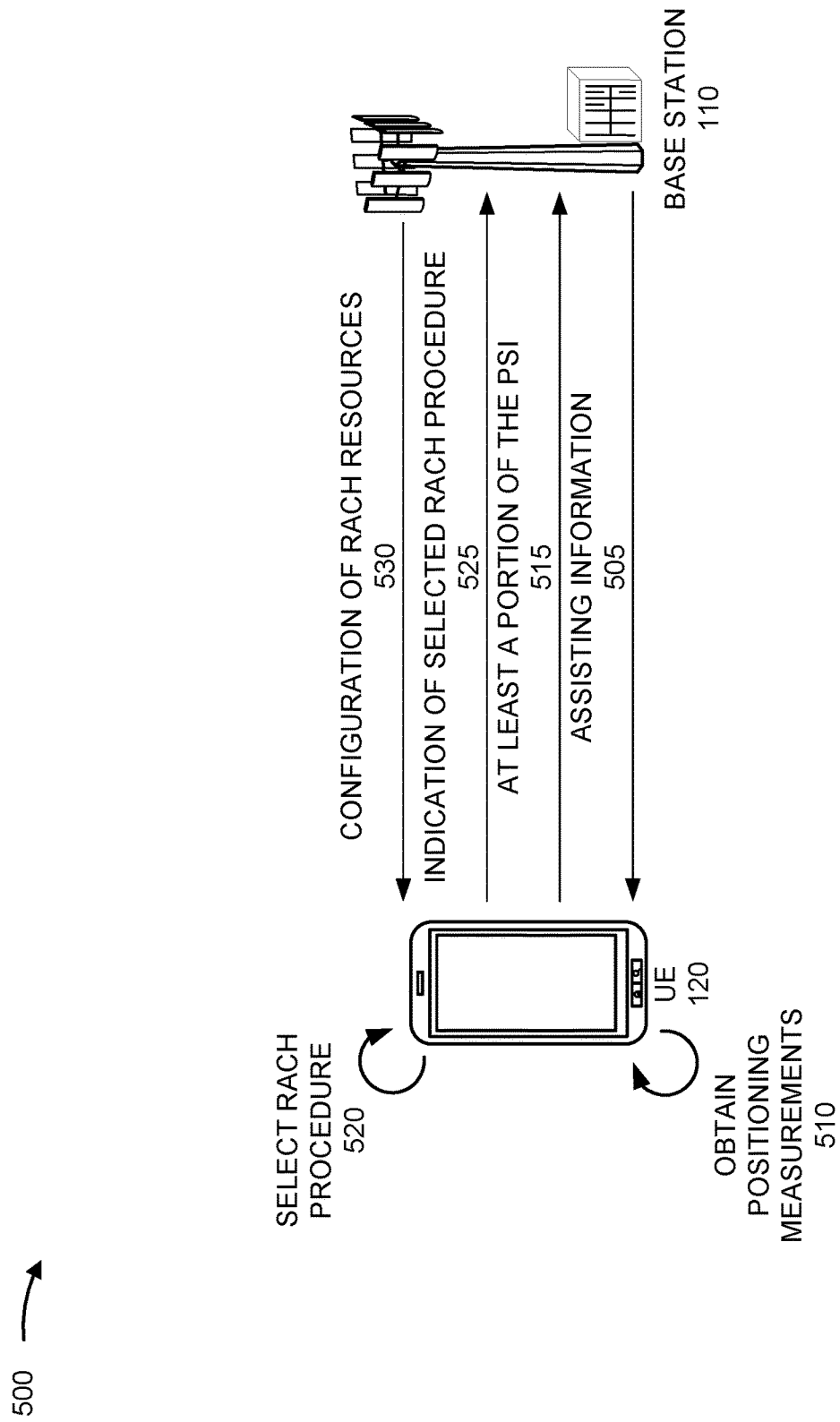
FIGS. 5 and 6 are diagrams illustrating examples of positioning aided NR RACH procedures, in accordance with the present disclosure.

FIG. 5 is a diagram illustrating an example 500 of a positioning aided NR RACH procedure, in accordance with the present disclosure. As shown, a UE 120 and a base station 110 may communicate with one another.

As shown by reference number 505, the base station 110 may transmit, and the UE 120 may receive, assisting information. The assisting information may include any number of different types of information that may be used by the UE 120 in obtaining positioning measurements. In some aspects, the assisting information may be transmitted to the UE 120 in response to receiving, from the UE 120, a request for positioning services. In some aspects, another base station 110 may transmit the assisting information to the UE 120.

As shown by reference number 510, the UE 120 may determine PSI by obtaining one or more positioning measurements associated with the UE 120. In some aspects, the positioning measurements may include one or more radio access technology (RAT)-dependent measurements. The RAT-dependent measurements may include one or more positioning measurements corresponding to a serving cell associated with the base station 110, one or more positioning measurements associated with one or more neighboring cells, and/or the like. In some aspects, the RAT-dependent measurements may be obtained based at least in part on the assisting information.

In some aspects, the positioning measurements may include one or more RAT-independent measurements. In some aspects, the UE 120 may include one or more sensors that may obtain positioning measurements associated with the UE 120 independent of a cell. In some aspects, the one or more sensors may correspond to a navigation system such as a global positioning system (GPS), and/or the like.

As shown by reference number 515, the UE 120 may transmit, and the base station 110 may receive, at least a portion of the PSI. In some aspects, the PSI may include the one or more positioning measurements. In some aspects, the positioning measurements may be reported as one or more vectors. In some aspects, a vector may include a set of one or more measurements associated with a particular time. In some aspects, the PSI may include timing measurements, such as reference signal time difference (RSTD), time difference between reception and transmission of signals (Rx-Tx), time of arrival (TOA), and/or the like; energy or power measurements, such as reference signal received power (RSRP), and/or the like; angle measurements, such as angle of arrival (AoA), angle of departure (AoD), and/or the like; quality metrics; velocity and/or trajectory measurements; reference transmission-reception point (TRP); multipath information; line of sight (LOS) or non-line of sight (NLOS) factors; signal to interference noise ratio (SINR); time stamps; and/or the like.

As shown by reference number 520, the UE 120 may select a RACH procedure. In some aspects, the UE 120 may select the RACH procedure based at least in part on the PSI. In some aspects, the selected RACH procedure may be selected based at least in part on a capability of the UE, a quality of service requirement, and/or the like. In some aspects, the selected RACH category may include CFRA or CBRA.

According to various aspects, the base station 110 may determine, based at least in part on the PSI, a position of the UE 120 relative to one or more cells. The one or more cells may include a cell associated with the base station, a neighboring cell, and/or the like. The base station 120 may further determine that the position of the UE 120 indicates that the UE 120 is at or near a cell edge. In some aspects, the UE 120 may determine the position of the UE 120. In some aspects, the base station 110 may transmit, to the UE 120, and indication of the position of the UE 120. In some aspects, the UE 120 may select the CFRA procedure and/or the two-step RACH procedure based at least in part on determining that the position of the UE 120 indicates that the UE 120 is at or near the cell edge.

In some aspects, the base station 110 may determine, based at least in part on the PSI, a velocity of the UE 120. In some aspects, the velocity of the UE 120 may be relative to one or more cells. The one or more cells may include a cell associated with the base station, a neighboring cell, and/or the like. In some aspects, the velocity of the UE 120 may be independent of any cells. The base station 110 may determine that the velocity of the UE 120 satisfies a velocity threshold and may select the CFRA procedure and/or the two-step RACH procedure based at least in part on determining that the velocity of the UE 120 satisfies the velocity threshold. In some aspects, the UE 120 may determine a velocity of the UE 120. In some aspects, the UE 120 may determine the velocity of the UE 120 by receiving an indication of the velocity from the base station 110. In some aspects, the UE 120 may determine that the velocity of the UE 120 satisfies a velocity threshold and may select the CFRA procedure and/or the two-step RACH procedure based at least in part on determining that the velocity of the UE 120 satisfies the velocity threshold.

In some aspects, the selected RACH procedure may be selected based at least in part on a priority level of the selected RACH procedure. The priority level of the selected RACH procedure may include a first priority level or a second priority level that is lower than the first priority level. In some aspects, the UE 120 may select the first priority level based at least in part on determining that the position of the UE 120 indicates that the UE 120 is at or near the cell edge. In some aspects, the UE 120 may select the first priority level based at least in part on determining that a velocity of the UE 120 satisfies a velocity threshold.

As shown by reference number 525, the UE 120 may transmit, and the base station 110 may receive, an indication of the selected RACH procedure. The indication of the selected RACH procedure may indicate a selected RACH category, a selected RACH type, a selected set of RACH resources, a selected RACH priority, and/or the like. In some aspects, the selected RACH category may include CFRA or CBRA and the selected RACH type may include a two-step RACH or a four-step RACH. In some aspects, the selected RACH priority may include a first priority or a second priority that is lower than the first priority.

In some aspects, the UE 120 may be in an RRC connected state and the selected RACH procedure may include a CFRA procedure. In some aspects, the UE 120 may be in an RRC connected state, RRC idle state, or an RRC inactive state, and the selected RACH procedure may include a CBRA procedure.

As shown by reference number 530, the base station 110 may transmit, and the UE 120 may receive, a configuration of resources for the selected RACH procedure. In some aspects, the configuration of resources may be carried in a dedicated RRC message. In some aspects, the RRC message may be addressed to a cell radio network temporary identifier (C-RNTI) of the UE 120. In some aspects, the configuration of resources may be indicated using a system information block (SIB).

In some aspects, the configuration of resources may include message 1 resources corresponding to a four-step CFRA or CBRA procedure, message A resources corresponding to a two-step CFRA or CBRA procedure, and/or the like. In some aspects, a priority level may be associated with a CBRA procedure associated with the UE 120. The priority level may be higher than a priority level of a CBRA procedure associated with another UE 120. In some aspects, the configuration of resources may include, based on the priority level, a plurality of sets of resources. Each set of resources of the plurality of sets of resources may correspond to a respective coverage extension level. In some aspects, each set of the plurality of sets of resources may include a dedicated preamble, a dedicated RACH occasion, and/or the like.

In some aspects, the configuration of resources may indicate one or more repetitions of an uplink message associated with the selected RACH procedure, one or more repetitions of a downlink message associated with the selected RACH procedure, frequency hopping for the uplink message associated with the selected RACH procedure, frequency hopping for the downlink message associated with the selected RACH procedure, and/or the like. In some aspects, the uplink message may include a message 1 of a four-step RACH procedure, a message 3 of the four-step RACH procedure, a hybrid automatic repeat request acknowledgment (HARQ-ACK) associated with a message 4 of the four-step RACH procedure, a message A of a two-step RACH procedure, a HARQ-ACK associated with a message B of the two-step RACH procedure, and/or the like. In some aspects, the downlink message may include a message 2 of a four-step RACH procedure, a message 4 of the four-step RACH procedure, a message B of a two-step RACH procedure, and/or the like.

In some aspects, the configuration of resources may be based at least in part on a coverage extension level. The coverage extension level may include a normal coverage extension level, an extended coverage extension level, and/or the like. In some aspects, the base station 110 may select the coverage extension level based at least in part on the PSI. In some aspects, the base station 110 may select the extended coverage extension level based at least in part on determining that a position of the UE 120 relative to a cell satisfies a range threshold. In some aspects, the UE 120 may select the coverage extension level based at least in part on the PSI. In some aspects, the UE 120 may select the extended coverage extension level based at least in part on determining that a position of the UE 120 relative to a cell satisfies a range threshold.

In some aspects, the selected RACH procedure may include a four-step RACH procedure having a first priority level that is higher than a second priority level. The UE 120 may transmit, and the base station 110 may receive, in a message 3, an indication of the first priority level. The selected RACH procedure may be prioritized based at least in part on the indication of the first priority level. In some aspects, the UE 120 may transmit the indication of the first priority level based at least in part on determining that a position of the UE 120 relative to a cell satisfies a range threshold. In some aspects, the UE 120 may transmit the indication of the first priority level based at least in part on determining that a velocity of the UE 120 satisfies a velocity threshold.

In some aspects, the selected RACH procedure may include a two-step RACH procedure having a first priority level that is higher than a second priority level. The UE 120 may transmit, and the base station 110 may receive, in a message A, an indication of the first priority level. In some aspects, the selected RACH procedure may be prioritized based at least in part on the indication of the first priority level. In some aspects, the selected RACH procedure may include a two-step RACH procedure having a first priority level that is higher than a second priority level. In some aspects, the UE 120 may transmit, in a message A, an indication of the first priority level based at least in part on determining that a position of the UE 120 relative to a cell satisfies a range threshold. In some aspects, the UE 120 may transmit, in a message A, an indication of the first priority level based at least in part on determining that a velocity of the UE 120 satisfies a velocity threshold.

In some aspects, the UE 120 may perform one or more RACH procedure attempts corresponding to the selected RACH procedure. The UE 120 may maintain a counter corresponding to a quantity of the one or more RACH procedure attempts. In some aspects, the UE 120 may perform, based at least in part on the counter, a preamble retransmission, a power ramping operation, and/or the like. In some aspects, the one or more RACH procedure attempts corresponding to the selected RACH procedure may include no more than a maximum quantity of RACH procedure attempts. In some aspects, a configuration of the maximum quantity of RACH procedure attempts may be received from the base station 110.

In some aspects, the UE 120 may determine that the maximum quantity of RACH procedure attempts has been performed without successfully completing the selected RACH procedure. As indicated above, the selected RACH procedure may be associated with a first RACH category and a first RACH type. The UE 120 may perform, based on determining that the maximum quantity of RACH procedure attempts have been performed without successfully completing the selected RACH procedure, an additional RACH procedure. In some aspects, the UE 120 may select, based on determining that the maximum quantity of RACH procedure attempts have been performed without successfully completing the selected RACH procedure, a higher coverage extension level.

In some aspects, the additional RACH procedure may be associated with a second RACH category, a second RACH type, and/or the like. In some aspects, the additional RACH procedure may include a prioritized CBRA procedure, a CFRA procedure, a two-step RACH procedure, a four-step RACH procedure, and/or the like.

In some aspects, the UE 120 may select a first RACH preamble for use with the one or more RACH procedure attempts according to the selected RACH procedure and/or may use an initial transmission power for the one or more RACH procedure attempts. The UE 120 may select a second RACH preamble for use with the additional RACH procedure, and may use, for the additional RACH procedure, the initial transmission power, an additional transmission power based at least in part on a power ramping operation, and/or the like.

In some aspects, the maximum quantity of RACH procedure attempts may be based at least in part on a capability of the UE, a coverage corresponding to a cell associated with the base station, a quality of service requirement, and/or the like. In some aspects the maximum quantity of RACH procedure attempts may be based at least in part on at least a portion of the PSI associated with the UE 120. In some aspects, the maximum quantity of RACH procedure attempts may be based at least in part on a position of the UE 120 relative to one or more cells, a velocity of the UE 120, and/or the like. In some aspects, the maximum quantity of RACH procedure attempts may include a first value based at least in part on at least one of a first position of the UE 120 relative to one or more cells, a first velocity of the UE 120 relative to the one or more cells, and/or the like. In some aspects, the maximum quantity of RACH procedure attempts may include a second value based at least in part on at least one of a second position of the UE 120 relative to the one or more cells, a second velocity of the UE 120 relative to the one or more cells, and/or the like. The first value may be higher than the second value based at least in part on the first position of the UE 120 relative to the one or more cells indicating that the UE 120 is at or near a cell edge, the first velocity of the UE 120 relative to the one or more cells being greater than the second velocity of the UE 120 relative to the one or more cells, and/or the like. In some aspects, the one or more cells may include a cell associated with the base station, a neighboring cell, and/or the like.

In some aspects, the configuration of resources may be based at least in part on a first priority level, corresponding to the UE 120, relative to a second priority level corresponding to an additional UE 120. The first priority level and the second priority level may be configured using a power-ramping factor associated with the selected RACH procedure, a scaling factor associated with the selected RACH procedure, and/or the like. In some aspects, the power-ramping factor may include a first value, corresponding to the UE 120, based at least in part on a position of the UE 120 relative to one or more cells, a velocity of the UE 120 relative to the one or more cells, and/or the like. In some aspects, the power-ramping factor may include a second value, corresponding to the additional UE 120, based at least in part on a position of the additional UE 120 relative to the one or more cells, a velocity of the additional UE 120 relative to the one or more cells, and/or the like. In some aspects, the first value may be higher than the second value based at least in part on the position of the UE 120 relative to the one or more cells indicating that the UE 120 is closer to a cell edge than the additional UE, the velocity of the UE 120 relative to the one or more cells being greater than the velocity of the additional UE 120 relative to the one or more cells, and/or the like.

In some aspects, the scaling factor may include a first value, corresponding to the UE 120, based at least in part on a position of the UE 120 relative to one or more cells, a velocity of the UE 120 relative to the one or more cells, and/or the like. In some aspects, the scaling factor may include a second value, corresponding to the additional UE 120, based at least in part on a position of the additional UE 120 relative to the one or more cells, a velocity of the additional UE 120 relative to the one or more cells, and/or the like. In some aspects, the first value may be higher than the second value based at least in part on the position of the UE 120 relative to the one or more cells indicating that the UE 120 is closer to a cell edge than the additional UE 120, the velocity of the UE 120 relative to the one or more cells being greater than the velocity of the additional UE 120 relative to the one or more cells, and/or the like.

Various aspects of the techniques described above may facilitate using PSI associated with the UE 120 to configured prioritized RACH procedures. In this way, the base station 110 may use PSI to optimize system performance of RACH, which may allow for lower latency, higher throughput, and increased conservation of resources.

As indicated above, FIG. 5 is provided as an example. Other examples may differ from what is described with respect to FIG. 5.

Figure 6:
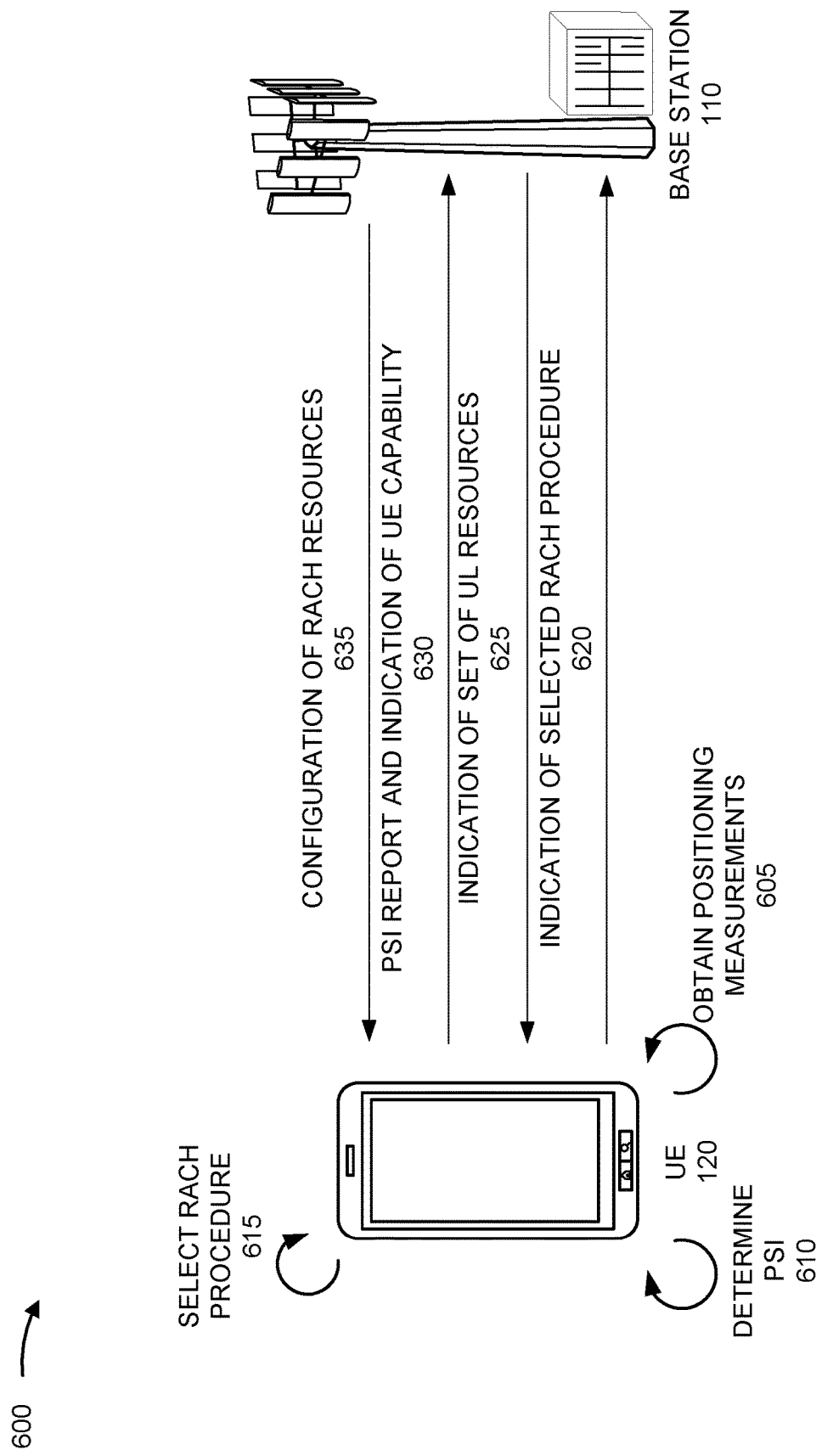

FIG. 6 is a diagram illustrating an example 600 of a positioning aided NR RACH procedure, in accordance with the present disclosure. As shown, a UE 120 and a base station 110 may communicate with one another.

As shown by reference number 605, the UE 120 may obtain one or more positioning measurements. In some aspects, the positioning measurements may include one or more radio RAT-dependent measurements, one or more RAT-independent measurements, and/or the like. As shown by reference number 610, the UE 120 may determine PSI associated with the UE 120. In some aspects, the UE 120 may determine the PSI based at least in part on the one or more positioning measurements. In some aspects, the PSI may include timing measurements, such as RSTD, Rx-Tx, TOA, and/or the like; energy or power measurements, such as RSRP, and/or the like; angle measurements, such as AoA, AoD, and/or the like; quality metrics; velocity and/or trajectory measurements; reference TRP; multipath information; LOS or NLOS factors; SINR; time stamps; and/or the like.

As shown by reference number 615, the UE 120 may select a RACH procedure. The UE 120 may select the RACH procedure based at least in part on the PSI, a capability of the UE, a quality of service requirement, and/or the like. Selection of the RACH procedure may be similar to, or the same as, aspects described above in connection with FIG. 5.

As shown by reference number 620, the UE 120 may transmit, and the base station 110 may receive, an indication of the selected RACH procedure. In some aspects, the indication of the selected RACH procedure may indicate a selected RACH category, a selected RACH type, a selected set of RACH resources, a selected RACH priority, and/or the like. In some aspects, the indication of the selected RACH procedure may be similar to, or the same as, the indication of the selected RACH procedure described above in connection with FIG. 5.

As shown by reference number 625, the base station 110 may transmit, and the UE 120 may receive, an indication of a set of uplink resources associated with a PUSCH or a PUCCH for transmitting a PSI report. As shown by reference number 630, the UE 120 may transmit, and the base station 110 may receive, a PSI report using the set of uplink resources. In some aspects, the PSI report may include one or more PSI elements of a set of PSI elements. In some aspects, as shown, the UE 120 may also transmit, and the base station 110 may also receive, an indication of a capability of the UE 120 associated with the selected RACH procedure.

In some aspects, the UE 120 may transmit, and the base station 110 may receive, an indication of a particular payload size for transmitting a subset of PSI elements of the set of PSI elements. The subset of PSI elements may include fewer than all of the set of PSI elements. In some aspects, the subset of PSI elements may include one or more RAT-dependent measurements. The RAT-dependent measurements may include one or more positioning measurements corresponding to a serving cell associated with the base station 110, one or more positioning measurements associated with one or more neighboring cells, and/or the like. In some aspects, the subset of PSI elements may include one or more RAT-independent measurements.

The UE 120 may determine that the PSI report has a payload size that is greater than a size of PUSCH allocated for transmission of the PSI report and the UE 120 may transmit an initial portion of the PSI report using the PUSCH. In some aspects, the UE 120 may transmit the initial portion of the PSI report according to a priority level that is higher than a priority level associated with a subsequent transmission of an additional portion of the PSI report.

In some aspects, the PSI report may include measurements associated with a set of selected cells and the initial portion of the PSI report may include measurements associated with a subset of the set of selected cells. In some aspects, the subset of the set of selected cells may include fewer than all of the set of selected cells. In some aspects, the subset of the set of selected cells may include a serving cell associated with the base station 110, a neighboring cell, and/or the like.

In aspects, the base station 110 may configure resources based at least in part on the initial portion of the PSI report. In some aspects, the UE 120 may transmit, and the base station 110 may receive, an indication that the PSI report comprises the additional portion of the PSI report. In this way, the base station 110 may expect a future transmission containing the additional portion of the PSI report, configure additional resources for the transmission of the additional portion of the PSI report, and/or the like.

As shown by reference number 635, the base station 110 may transmit, and the UE 120 may receive, a configuration of resources for the selected RACH procedure. In some aspects, the configuration of resources may be based at least in part on at least a portion of the PSI report, a capability of the UE, and/or the like.

In some aspects described above, the UE 120 may provide a PSI report to the base station 110. In this way, for example, the base station 110 may configure a RACH procedure to support a prioritized handover for high-speed UEs 120. The handover may be configured by allocating dedicated RACH resources for CFRA, whereas lower-speed UEs 120 may be allocated shared resources to attempt CBRA. In this way, latency for UEs 120 that need more urgent RACH procedures may be reduced, while dedicated RACH resources may be conserved by configuring UEs 120 that need less urgent RACH procedures with shared resources.

As indicated above, FIG. 6 is provided as an example. Other examples may differ from what is described with respect to FIG. 6.

Figure 7:
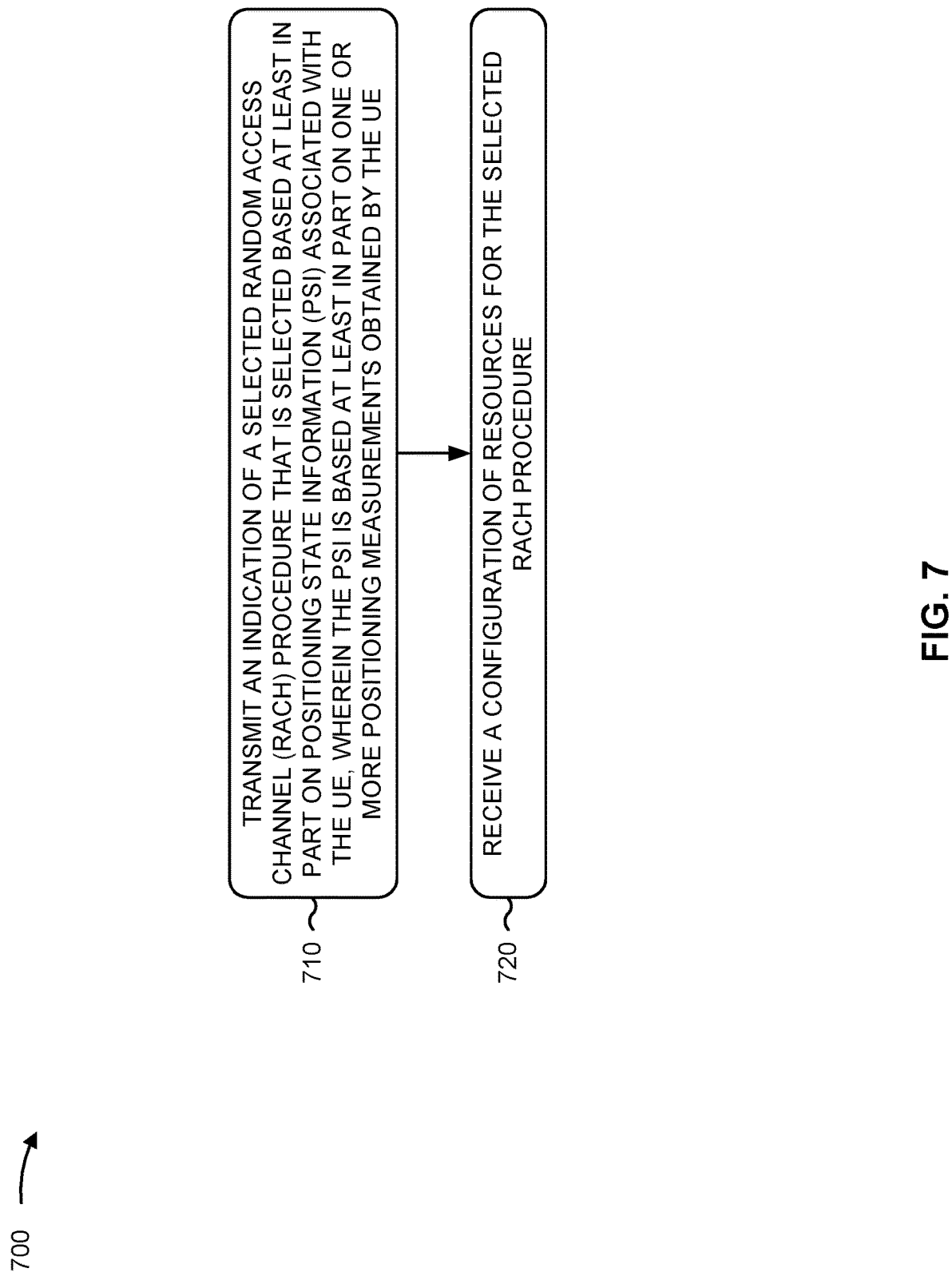
FIG. 7 is a diagram illustrating an example process performed, for example, by a user equipment, in accordance with the present disclosure.

FIG. 7 is a diagram illustrating an example process 700 performed, for example, by a UE, in accordance with the present disclosure. Example process 700 is an example where the UE (e.g., UE 120 and/or the like) performs operations associated with a positioning aided NR RACH procedure.

As shown in FIG. 7, in some aspects, process 700 may include transmitting, to a base station, an indication of a selected RACH procedure that is selected based at least in part on PSI associated with the UE, wherein the PSI is based at least in part on one or more positioning measurements obtained by the UE (block 710). For example, the UE (e.g., using transmit processor 264, controller/processor 280, memory 282, and/or the like) may transmit, to a base station, an indication of a selected RACH procedure that is selected based at least in part on PSI associated with the UE, as described above. In some aspects, the PSI is based at least in part on one or more positioning measurements obtained by the UE.

As further shown in FIG. 7, in some aspects, process 700 may include receiving, from the base station, a configuration of resources for the selected RACH procedure (block 720). For example, the UE (e.g., using receive processor 258, controller/processor 280, memory 282, and/or the like) may receive, from the base station, a configuration of resources for the selected RACH procedure, as described above.

Process 700 may include additional aspects, such as any single aspect or any combination of aspects described below and/or in connection with one or more other processes described elsewhere herein.

In a first aspect, process 700 includes obtaining the one or more positioning measurements.

In a second aspect, alone or in combination with the first aspect, process 700 includes receiving assisting information from the base station; obtaining the one or more positioning measurements based at least in part on the assisting information; transmitting, to the base station, at least a portion of the PSI; and selecting the selected RACH procedure based at least in part on the PSI.

In a third aspect, alone or in combination with one or more of the first and second aspects, process 700 includes obtaining the one or more positioning measurements; determining the PSI based at least in part on the one or more positioning measurements; and selecting the selected RACH procedure based at least in part on the PSI.

In a fourth aspect, alone or in combination with one or more of the first through third aspects, the selected RACH procedure is selected based at least in part on: a capability of the UE, a quality of service requirement, or a combination thereof.

In a fifth aspect, alone or in combination with one or more of the first through fourth aspects, the indication of the selected RACH procedure indicates at least one of: a selected RACH category, a selected RACH type, a selected set of RACH resources, a selected RACH priority, or a combination thereof.

In a sixth aspect, alone or in combination with the fifth aspect, the selected RACH category comprises CFRA or CBRA.

In a seventh aspect, alone or in combination with one or more of the fifth through sixth aspects, the selected RACH type comprises two-step RACH or four-step RACH.

In an eighth aspect, alone or in combination with one or more of the fifth through seventh aspects, the selected RACH priority comprises a first priority or a second priority that is lower than the first priority.

In a ninth aspect, alone or in combination with one or more of the first through eighth aspects, the UE is in an RRC connected state, and the selected RACH procedure comprises a CFRA procedure.

In a tenth aspect, alone or in combination with one or more of the first through ninth aspects, process 700 includes transmitting, to the base station, a PSI report, comprising one or more PSI elements of a set of PSI elements, and an indication of a capability of the UE associated with the selected RACH procedure.

In an eleventh aspect, alone or in combination with the tenth aspect, the configuration of resources is based at least in part on at least a portion of the PSI report and a capability of the UE.

In a twelfth aspect, alone or in combination with one or more of the tenth through eleventh aspects, process 700 includes receiving, from the base station, an indication of a set of uplink resources associated with a physical uplink shared channel or a physical uplink control channel, wherein transmitting the PSI report comprises transmitting the PSI report using the set of uplink resources.

In a thirteenth aspect, alone or in combination with one or more of the tenth through twelfth aspects, process 700 includes transmitting, to the base station, an indication of a particular payload size for transmitting a subset of PSI elements of the set of PSI elements, wherein the subset of PSI elements comprises fewer than all of the set of PSI elements.

In a fourteenth aspect, alone or in combination with the thirteenth aspect, the subset of PSI elements comprises one or more RAT-dependent measurements comprising at least one of: one or more positioning measurements corresponding to a serving cell associated with the base station, one or more positioning measurements associated with one or more neighboring cells, or a combination thereof.

In a fifteenth aspect, alone or in combination with one or more of the thirteenth through fourteenth aspects, the subset of PSI elements comprises one or more RAT-independent measurements obtained using one or more sensors.

In a sixteenth aspect, alone or in combination with one or more of the tenth through fifteenth aspects, process 700 includes determining that the PSI report has a payload size that is greater than a size of a PUSCH allocated for transmission of the PSI report, wherein transmitting the PSI report comprises transmitting an initial portion of the PSI report, using the PUSCH, according to a priority level that is higher than a priority level associated with a subsequent transmission of an additional portion of the PSI report.

In a seventeenth aspect, alone or in combination with the sixteenth aspect, the PSI report comprises measurements associated with a set of selected cells, and the initial portion of the PSI report comprises measurements associated with a subset of the set of selected cells, wherein the subset of the set of selected cells comprises fewer than all of the set of selected cells.

In an eighteenth aspect, alone or in combination with the seventeenth aspect, the subset of the set of selected cells comprises a serving cell associated with the base station and a neighboring cell.

In a nineteenth aspect, alone or in combination with one or more of the sixteenth through eighteenth aspects, the configuration of resources is based at least in part on the initial portion of the PSI report.

In a twentieth aspect, alone or in combination with one or more of the sixteenth through nineteenth aspects, process 700 includes transmitting, to the base station, an indication that the PSI report comprises the additional portion of the PSI report.

In a twenty-first aspect, alone or in combination with one or more of the first through twentieth aspects, the configuration of resources is carried in a dedicated RRC message.

In a twenty-second aspect, alone or in combination with the twenty-first aspect, the RRC message is addressed to a C-RNTI of the UE.

In a twenty-third aspect, alone or in combination with one or more of the first through twenty-second aspects, the configuration of resources indicates at least one of: one or more repetitions of an uplink message associated with the selected RACH procedure, one or more repetitions of a downlink message associated with the selected RACH procedure, frequency hopping for the uplink message associated with the selected RACH procedure, frequency hopping for the downlink message associated with the selected RACH procedure, or a combination thereof.

In a twenty-fourth aspect, alone or in combination with the twenty-third aspect, the uplink message includes at least one of: a message 1 of a four-step RACH procedure, a message 3 of the four-step RACH procedure, a HARQ-ACK associated with a message 4 of the four-step RACH procedure, a message A of a two-step RACH procedure, a HARQ-ACK associated with a message B of the two-step RACH procedure, or a combination thereof.

In a twenty-fifth aspect, alone or in combination with one or more of the twenty-third through twenty-fourth aspects, the downlink message includes at least one of: a message 2 of a four-step RACH procedure, a message 4 of the four-step RACH procedure, a message B of a two-step RACH procedure, or a combination thereof.

In a twenty-sixth aspect, alone or in combination with one or more of the first through twenty-fifth aspects, process 700 includes performing one or more RACH procedure attempts corresponding to the selected RACH procedure; and maintaining a counter corresponding to a quantity of the one or more RACH procedure attempts.

In a twenty-seventh aspect, alone or in combination with the twenty-sixth aspect, process 700 includes performing, based at least in part on the counter, at least one of: a preamble retransmission, a power ramping operation, or a combination thereof.

In a twenty-eighth aspect, alone or in combination with one or more of the twenty-sixth through twenty-seventh aspects, the one or more RACH procedure attempts corresponding to the selected RACH procedure comprise no more than a maximum quantity of RACH procedure attempts, wherein a configuration of the maximum quantity of RACH procedure attempts is received from the base station.

In a twenty-ninth aspect, alone or in combination with the twenty-eighth aspect, process 700 includes determining that the maximum quantity of RACH procedure attempts have been performed without successfully completing the selected RACH procedure, wherein the selected RACH procedure is being associated with a first RACH category and a first RACH type; and performing, based on determining that the maximum quantity of RACH procedure attempts have been performed without successfully completing the selected RACH procedure, at least one of: an additional RACH procedure, wherein the additional RACH procedure is associated with at least one of a second RACH category, a second RACH type, or a combination thereof, a higher coverage extension level, or a combination thereof.

In a thirtieth aspect, alone or in combination with the twenty-ninth aspect, the additional RACH procedure comprises at least one of: a prioritized contention based random access procedure, wherein the selected RACH procedure comprises a contention free random access procedure, a two-step RACH procedure, a four-step RACH procedure, or a combination thereof.

In a thirty-first aspect, alone or in combination with one or more of the twenty-ninth through thirtieth aspects, process 700 includes selecting a first RACH preamble for use with the one or more RACH procedure attempts; using an initial transmission power for the one or more RACH procedure attempts; selecting a second RACH preamble for use with the additional RACH procedure; and using, for the additional RACH procedure, at least one of: the initial transmission power, an additional transmission power based at least in part on a power ramping operation, or a combination thereof.

In a thirty-second aspect, alone or in combination with one or more of the twenty-eighth through thirty-first aspects, the maximum quantity of RACH procedure attempts is based at least in part on at least one of: a capability of the UE, a coverage corresponding to a cell associated with the base station, a quality of service requirement, or a combination thereof.

In a thirty-third aspect, alone or in combination with one or more of the twenty-eighth through thirty-second aspects, the maximum quantity of RACH procedure attempts is based at least in part on at least a portion of the PSI associated with the UE.

In a thirty-fourth aspect, alone or in combination with one or more of the twenty-eighth through thirty-third aspects, the maximum quantity of RACH procedure attempts is based at least in part on at least one of: a position of the UE relative to one or more cells, a velocity of the UE relative to one or more cells, or a combination thereof.

In a thirty-fifth aspect, alone or in combination with one or more of the twenty-eighth through thirty-fourth aspects, the maximum quantity of RACH procedure attempts comprises: a first value based at least in part on at least one of a first position of the UE relative to one or more cells, a first velocity of the UE relative to the one or more cells, or a combination of both; or a second value based at least in part on at least one of a second position of the UE relative to the one or more cells, a second velocity of the UE relative to the one or more cells, or a combination of both, wherein the first value is higher than the second value based at least in part on: the first position of the UE relative to the one or more cells indicating that the UE is at or near a cell edge, the first velocity of the UE relative to the one or more cells being greater than the second velocity of the UE relative to the one or more cells, or a combination thereof.

In a thirty-sixth aspect, alone or in combination with the thirty-fifth aspect, the one or more cells comprise at least one of: a cell associated with the base station, a neighboring cell, or a combination thereof.

In a thirty-seventh aspect, alone or in combination with one or more of the first through thirty-sixth aspects, the configuration of resources is based at least in part on a first priority level, corresponding to the UE, relative to a second priority level corresponding to an additional UE, wherein the first priority level and the second priority level are configured using at least one of: a power-ramping factor associated with the selected RACH procedure, a scaling factor associated with the selected RACH procedure, or a combination thereof.

In a thirty-eighth aspect, alone or in combination with the thirty-seventh aspect, the power-ramping factor comprises: a first value, corresponding to the UE, based at least in part on at least one of a position of the UE relative to one or more cells, a velocity of the UE relative to the one or more cells, or a combination of both; and a second value, corresponding to the additional UE, based at least in part on at least one of a position of the additional UE relative to the one or more cells, a velocity of the additional UE relative to the one or more cells, or a combination of both, wherein the first value is higher than the second value based at least in part on: the position of the UE relative to the one or more cells indicating that the UE is closer to a cell edge than the additional UE, the velocity of the UE relative to the one or more cells being greater than the velocity of the additional UE relative to the one or more cells, or a combination thereof.

In a thirty-ninth aspect, alone or in combination with one or more of the thirty-seventh through thirty-eighth aspects, the scaling factor comprises: a first value, corresponding to the UE, based at least in part on at least one of a position of the UE relative to one or more cells, a velocity of the UE relative to the one or more cells, or a combination of both; and a second value, corresponding to the additional UE, based at least in part on at least one of a position of the additional UE relative to the one or more cells, a velocity of the additional UE relative to the one or more cells, or a combination of both, wherein the first value is higher than the second value based at least in part on: the position of the UE relative to the one or more cells indicating that the UE is closer to a cell edge than the additional UE, the velocity of the UE relative to the one or more cells being greater than the velocity of the additional UE relative to the one or more cells, or a combination thereof.

In a fortieth aspect, alone or in combination with one or more of the first through thirty ninth aspects, the selected RACH procedure comprises a CBRA procedure, the CBRA procedure comprising a four-step CBRA procedure or a two-step CBRA procedure.

In a forty-first aspect, alone or in combination with the fortieth aspect, the configuration of resources comprises at least one of: message 1 resources corresponding to the four-step CBRA procedure, or message A resources corresponding to the two-step CBRA procedure.

In a forty-second aspect, alone or in combination with one or more of the fortieth through forty-first aspects, a priority level is associated with the CBRA procedure associated with the UE, the priority level is higher than a priority level of a CBRA procedure associated with another UE, and the configuration of resources comprises, based on the priority level, a plurality of sets of resources, each set of resources of the plurality of sets of resources corresponding to a respective coverage extension level, each set of the plurality of sets of resources comprises at least one of: a dedicated preamble, a dedicated RACH occasion, or a combination thereof.

In a forty-third aspect, alone or in combination with one or more of the first through forty-second aspects, the configuration of resources is indicated using a SIB.

In a forty-fourth aspect, alone or in combination with one or more of the first through forty-third aspects, the selected RACH procedure comprises a four-step RACH procedure or a two-step RACH procedure.

In a forty-fifth aspect, alone or in combination with the forty-fourth aspect, process 700 includes determining, based at least in part on the PSI, a position of the UE relative to one or more cells, wherein the one or more cells comprise a cell associated with the base station, a neighboring cell, or a combination thereof; determining that the position of the UE indicates that the UE is at or near a cell edge; and selecting the two-step RACH procedure based at least in part on determining that the position of the UE indicates that the UE is at or near the cell edge.

In a forty-sixth aspect, alone or in combination with one or more of the forty-fourth through forty-fifth aspects, process 700 includes determining, based at least in part on the PSI, a velocity of the UE relative to one or more cells, wherein the one or more cells comprise a cell associated with the base station, a neighboring cell, or a combination thereof; determining that the velocity of the UE satisfies a velocity threshold; and selecting the two-step RACH procedure based at least in part on determining that the velocity of the UE satisfies the velocity threshold.

In a forty-seventh aspect, alone or in combination with one or more of the first through forty-sixth aspects, the configuration of resources is based at least in part on a coverage extension level, the coverage extension level comprising at least one of: a normal coverage extension level, an extended coverage extension level, or a combination thereof.

In a forty-eighth aspect, alone or in combination with the forty-seventh aspect, process 700 includes selecting the coverage extension level based at least in part on the PSI.

In a forty-ninth aspect, alone or in combination with one or more of the forty-seventh through forty-eighth aspects, process 700 includes determining, based at least in part on the PSI, a position of the UE relative to one or more cells, wherein the one or more cells comprise a cell associated with the base station, a neighboring cell, or a combination thereof; determining that the position of the UE satisfies a range threshold; and selecting the extended coverage extension level based at least in part on determining that the position of the UE satisfies the range threshold.

In a fiftieth aspect, alone or in combination with one or more of the first through forty ninth aspects, the selected RACH procedure is selected based at least in part on a priority level of the selected RACH procedure, the priority level of the selected RACH procedure comprises at least one of: a first priority level, or a second priority level that is lower than the first priority level.

In a fifty-first aspect, alone or in combination with the fiftieth aspect, process 700 includes determining, based at least in part on the PSI, a position of the UE relative to one or more cells, wherein the one or more cells comprise a cell associated with the base station, a neighboring cell, or a combination thereof; determining that the position of the UE indicates that the UE is at or near a cell edge; and selecting the first priority level based at least in part on determining that the position of the UE indicates that the UE is at or near the cell edge.

In a fifty-second aspect, alone or in combination with one or more of the fiftieth through fifty-first aspects, process 700 includes determining, based at least in part on the PSI, a velocity of the UE relative to one or more cells, wherein the one or more cells comprise a cell associated with the base station, a neighboring cell, or a combination thereof; determining that the velocity of the UE satisfies a velocity threshold; and selecting the first priority level based at least in part on determining that the velocity of the UE satisfies the velocity threshold.

In a fifty-third aspect, alone or in combination with one or more of the first through forty-fourth aspects, the selected RACH procedure comprises a four-step RACH procedure having a first priority level that is higher than a second priority level, and process 700 includes transmitting, in a message 3, an indication of the first priority level.

In a fifty-fourth aspect, alone or in combination with the fifty-third aspects, the selected RACH procedure is to be prioritized based at least in part on the indication of the first priority level.

In a fifty-fifth aspect, alone or in combination with one or more of the first through forty-fourth aspects, the selected RACH procedure comprises a four-step RACH procedure having a first priority level that is higher than a second priority level, and process 700 includes determining, based at least in part on the PSI, a position of the UE relative to one or more cells, the one or more cells comprise a cell associated with the base station, a neighboring cell, or a combination thereof, and determining that the position of the UE satisfies a range threshold; and transmitting, in a message 3, an indication of the first priority level based at least in part on determining that the position of the UE satisfies the range threshold.

In a fifty-sixth aspect, alone or in combination with one or more of the first through forty-fourth aspects, the selected RACH procedure comprises a four-step RACH procedure having a first priority level that is higher than a second priority level, and process 700 includes determining, based at least in part on the PSI, a velocity of the UE relative to one or more cells, the one or more cells comprise a cell associated with the base station, a neighboring cell, or a combination thereof; determining that the velocity of the UE satisfies a velocity threshold, and transmitting, in a message 3, an indication of the first priority level based at least in part on determining that the velocity of the UE satisfies the velocity threshold.

In a fifty-seventh aspect, alone or in combination with one or more of the first through forty-fourth aspects, the selected RACH procedure comprises a two-step RACH procedure having a first priority level that is higher than a second priority level, and process 700 includes transmitting, in a message A, an indication of the first priority level.

In a fifty-eighth aspect, alone or in combination with the fifty-seventh aspect, the selected RACH procedure is to be prioritized based at least in part on the indication of the first priority level.

In a fifty-ninth aspect, alone or in combination with one or more of the first through forty-fourth aspects, the selected RACH procedure comprises a two-step RACH procedure having a first priority level that is higher than a second priority level, and process 700 includes determining, based at least in part on the PSI, a position of the UE relative to one or more cells, the one or more cells comprise a cell associated with the base station, a neighboring cell, or a combination thereof; determining that the position of the UE satisfies a range threshold; and transmitting, in a message A, an indication of the first priority level based at least in part on determining that the position of the UE satisfies the range threshold.

In a sixtieth aspect, alone or in combination with one or more of the first through forty-fourth aspects, the selected RACH procedure comprises a two-step RACH procedure having a first priority level that is higher than a second priority level, and process 700 includes determining, based at least in part on the PSI, a velocity of the UE relative to one or more cells, the one or more cells comprise a cell associated with the base station, a neighboring cell, or a combination thereof; determining that the velocity of the UE satisfies a velocity threshold, and transmitting, in a message A, an indication of the first priority level based at least in part on determining that the velocity of the UE satisfies the velocity threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
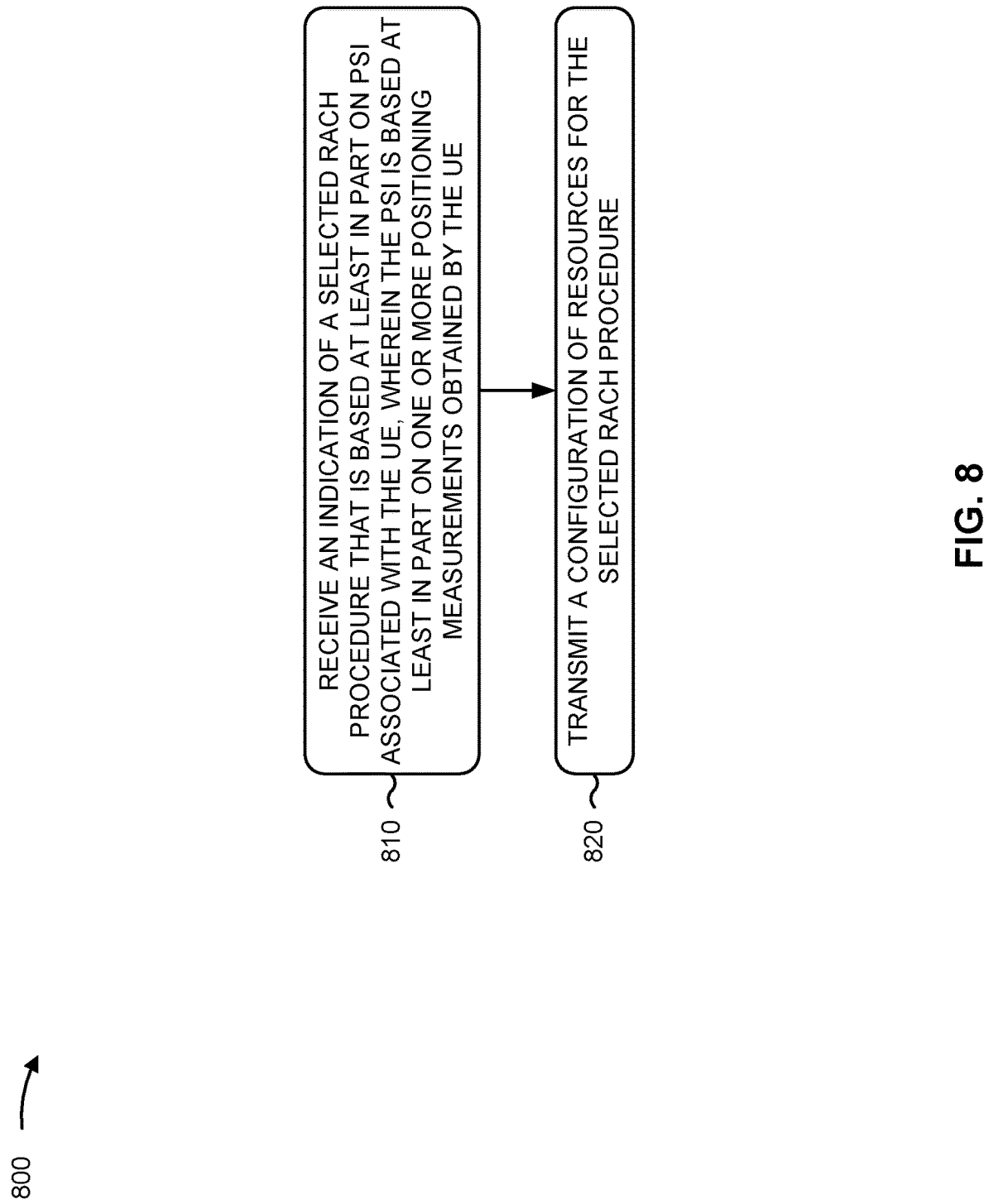
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110 and/or the like) performs operations associated with a positioning aided NR RACH procedure.

As shown in FIG. 8, in some aspects, process 800 may include receiving, from a UE, an indication of a selected RACH procedure that is based at least in part on PSI associated with the UE, wherein the PSI is based at least in part on one or more positioning measurements obtained by the UE (block 810). For example, the base station (e.g., using receive processor 238, controller/processor 240, memory 242, and/or the like) may receive, from a UE, an indication of a selected RACH procedure that is based at least in part on PSI associated with the UE, as described above. In some aspects, the PSI is based at least in part on one or more positioning measurements obtained by the UE.

As further shown in FIG. 8, in some aspects, process 800 may include transmitting, to the UE, a configuration of resources for the selected RACH procedure (block 820). For example, the base station (e.g., using transmit processor 220, controller/processor 240, memory 242, and/or the like) may transmit, to the UE, a configuration of resources for the selected RACH procedure, as described above.

Process 800 may include additional aspects, such as any single aspect or any combination of aspects described below and/or in connection with one or more other processes described elsewhere herein.

In a first aspect, process 800 includes transmitting assisting information to the UE; and receiving, from the UE, at least a portion of the PSI, wherein the PSI comprises one or more positioning measurements based at least in part on the assisting information.

In a second aspect, alone or in combination with the first aspect, the selected RACH procedure is selected based at least in part on: a capability of the UE, a quality of service requirement, or a combination thereof.

In a third aspect, alone or in combination with one or more of the first and second aspects, the indication of the selected RACH procedure indicates at least one of: a selected RACH category, a selected RACH type, a selected set of RACH resources, a selected RACH priority, or a combination thereof.

In a fourth aspect, alone or in combination with the third aspect, the selected RACH category comprises CFRA or CBRA.

In a fifth aspect, alone or in combination with one or more of the third through fourth aspects, the selected RACH type comprises two-step RACH or four-step RACH.

In a sixth aspect, alone or in combination with one or more of the third through fifth aspects, the selected RACH priority comprises a first priority or a second priority that is lower than the first priority.

In a seventh aspect, alone or in combination with one or more of the first through sixth aspects, the UE is in an RRC connected state, and the selected RACH procedure comprises a CFRA procedure.

In an eighth aspect, alone or in combination with one or more of the first through seventh aspects, process 800 includes receiving, from the UE, a PSI report, comprising one or more PSI elements of a set of PSI elements, and an indication of a capability of the UE associated with the selected RACH procedure.

In a ninth aspect, alone or in combination with the eighth aspect, the configuration of resources is based at least in part on at least a portion of the PSI report and a capability of the UE.

In a tenth aspect, alone or in combination with one or more of the eighth through ninth aspects, process 800 includes transmitting, to the UE, an indication of a set of uplink resources associated with a PUSCH or a PUCCH, wherein the PSI report is transmitted using the set of uplink resources.

In an eleventh aspect, alone or in combination with one or more of the eighth through tenth aspects, process 800 includes receiving, from the UE, an indication of a particular payload size for transmitting a subset of PSI elements of the set of PSI elements, wherein the subset of PSI elements comprises fewer than all of the set of PSI elements.

In a twelfth aspect, alone or in combination with the eleventh aspect, the subset of PSI elements comprises one or more RAT-dependent measurements comprising at least one of: one or more positioning measurements corresponding to a serving cell associated with the base station, one or more positioning measurements associated with one or more neighboring cells, or a combination thereof.

In a thirteenth aspect, alone or in combination with one or more of the eleventh through twelfth aspects, the subset of PSI elements comprises one or more RAT-independent measurements obtained using one or more sensors.

In a fourteenth aspect, alone or in combination with one or more of the eighth through thirteenth aspects, the PSI report has a payload size that is greater than a size of a PUSCH allocated for transmission of the PSI report, and wherein receiving the PSI report comprises receiving an initial portion of the PSI report, using the PUSCH, according to a priority level that is higher than a priority level associated with a subsequent receipt of an additional portion of the PSI report.

In a fifteenth aspect, alone or in combination with the fourteenth aspect, the PSI report comprises measurements associated with a set of selected cells, and the initial portion of the PSI report comprises measurements associated with a subset of the set of selected cells, the subset of the set of selected cells comprises fewer than all of the set of selected cells.

In a sixteenth aspect, alone or in combination with the fifteenth aspect, the subset of the set of selected cells comprises a serving cell associated with the base station and a neighboring cell.

In a seventeenth aspect, alone or in combination with one or more of the fourteenth through sixteenth aspects, the configuration of resources is based at least in part on the initial portion of the PSI report.

In an eighteenth aspect, alone or in combination with one or more of the fourteenth through seventeenth aspects, process 800 includes receiving, from the UE, an indication that the PSI report comprises the additional portion of the PSI report.

In a nineteenth aspect, alone or in combination with one or more of the first through eighteenth aspects, the configuration of resources is carried in a dedicated RRC message.

In a twentieth aspect, alone or in combination with the nineteenth aspect, the RRC message is addressed to a C-RNTI of the UE.

In a twenty-first aspect, alone or in combination with one or more of the first through twentieth aspects, the configuration of resources indicates at least one of: one or more repetitions of an uplink message associated with the selected RACH procedure, one or more repetitions of a downlink message associated with the selected RACH procedure, frequency hopping for the uplink message associated with the selected RACH procedure, frequency hopping for the downlink message associated with the selected RACH procedure, or a combination thereof.

In a twenty-second aspect, alone or in combination with the through twenty-first aspect, the uplink message includes at least one of: a message 1 of a four-step RACH procedure, a message 3 of the four-step RACH procedure, a HARQ-ACK associated with a message 4 of the four-step RACH procedure, a message A of a two-step RACH procedure, a HARQ-ACK associated with a message B of the two-step RACH procedure, or a combination thereof.

In a twenty-third aspect, alone or in combination with one or more of the twenty-first through twenty-second aspects, the downlink message includes at least one of: a message 2 of a four-step RACH procedure, a message 4 of the four-step RACH procedure, a message B of a two-step RACH procedure, or a combination thereof.

In a twenty-fourth aspect, alone or in combination with one or more of the first through twenty-third aspects, process 800 includes transmitting, to the UE, a configuration of a maximum quantity of RACH procedure attempts corresponding to the selected RACH procedure.

In a twenty-fifth aspect, alone or in combination with the twenty-fourth aspect, the maximum quantity of RACH procedure attempts is based at least in part on at least a portion of the PSI associated with the UE.

In a twenty-sixth aspect, alone or in combination with one or more of the twenty-fourth through twenty-fifth aspects, the maximum quantity of RACH procedure attempts is based at least in part on at least one of: a position of the UE relative to one or more cells, a velocity of the UE relative to one or more cells, or a combination thereof.

In a twenty-seventh aspect, alone or in combination with one or more of the twenty-fourth through twenty-sixth aspects, the maximum quantity of RACH procedure attempts comprises: a first value based at least in part on at least one of a first position of the UE relative to one or more cells, a first velocity of the UE relative to the one or more cells, or a combination of both; or a second value based at least in part on at least one of a second position of the UE relative to the one or more cells, a second velocity of the UE relative to the one or more cells, or a combination of both, wherein the first value is higher than the second value based at least in part on: the first position of the UE relative to the one or more cells indicating that the UE is at or near a cell edge, the first velocity of the UE relative to the one or more cells being greater than the second velocity of the UE relative to the one or more cells, or a combination thereof.

In a twenty-eighth aspect, alone or in combination with the twenty-seventh aspect, the one or more cells comprise at least one of: a cell associated with the base station, a neighboring cell, or a combination thereof.

In a twenty-ninth aspect, alone or in combination with one or more of the first through twenty eighth aspects, the configuration of resources is based at least in part on a first priority level, corresponding to the UE, relative to a second priority level corresponding to an additional UE, wherein the first priority level and the second priority level are configured using at least one of: a power-ramping factor associated with the selected RACH procedure, a scaling factor associated with the selected RACH procedure, or a combination thereof.

In a thirtieth aspect, alone or in combination with the twenty-ninth aspect, the power-ramping factor comprises: a first value, corresponding to the UE, based at least in part on at least one of a position of the UE relative to one or more cells, a velocity of the UE relative to the one or more cells, or a combination of both; and a second value, corresponding to the additional UE, based at least in part on at least one of a position of the additional UE relative to the one or more cells, a velocity of the additional UE relative to the one or more cells, or a combination of both, wherein the first value is higher than the second value based at least in part on: the position of the UE relative to the one or more cells indicating that the UE is closer to a cell edge than the additional UE, the velocity of the UE relative to the one or more cells being greater than the velocity of the additional UE relative to the one or more cells, or a combination thereof.

In a thirty-first aspect, alone or in combination with one or more of the twenty-ninth through thirtieth aspects, the scaling factor comprises: a first value, corresponding to the UE, based at least in part on at least one of a position of the UE relative to one or more cells, a velocity of the UE relative to the one or more cells, or a combination of both; and a second value, corresponding to the additional UE, based at least in part on at least one of a position of the additional UE relative to the one or more cells, a velocity of the additional UE relative to the one or more cells, or a combination of both, wherein the first value is higher than the second value based at least in part on: the position of the UE relative to the one or more cells indicating that the UE is closer to a cell edge than the additional UE, the velocity of the UE relative to the one or more cells being greater than the velocity of the additional UE relative to the one or more cells, or a combination thereof.

In a thirty-second aspect, alone or in combination with one or more of the first through thirty-first aspects, the selected RACH procedure comprises a CBRA procedure, the CBRA procedure comprising a four-step CBRA procedure or a two-step CBRA procedure.

In a thirty-third aspect, alone or in combination with the thirty-second aspect, the configuration of resources comprises at least one of: message 1 resources corresponding to the four-step CBRA procedure, or message A resources corresponding to the two-step CBRA procedure.

In a thirty-fourth aspect, alone or in combination with one or more of the thirty-second through thirty-third aspects, a priority level is associated with the CBRA procedure associated with the UE, wherein the priority level is higher than a priority level of a CBRA procedure associated with another UE, and the configuration of resources comprises, based at least in part on the priority level, a plurality of sets of resources, wherein each set of resources of the plurality of sets of resources corresponding to a respective coverage extension level, and wherein each set of the plurality of sets of resources comprises at least one of: a dedicated preamble, a dedicated RACH occasion, or a combination thereof.

In a thirty-fifth aspect, alone or in combination with one or more of the first through thirty-fourth aspects, the configuration of resources is indicated using a SIB.

In a thirty-sixth aspect, alone or in combination with one or more of the first through thirty-fifth aspects, the selected RACH procedure comprises a four-step RACH procedure or a two-step RACH procedure.

In a thirty-seventh aspect, alone or in combination with the thirty-sixth aspect, the selected RACH procedure comprises the two-step RACH procedure based at least in part on the UE being at or near a cell edge.

In a thirty-eighth aspect, alone or in combination with one or more of the thirty-sixth through thirty-seventh aspects, the selected RACH procedure comprises the two-step RACH procedure based at least in part on a velocity of the UE satisfying a velocity threshold.

In a thirty-ninth aspect, alone or in combination with one or more of the first through thirty-eighth aspects, the configuration of resources is based at least in part on a coverage extension level, the coverage extension level comprising at least one of: a normal coverage extension level, an extended coverage extension level, or a combination thereof.

In a fortieth aspect, alone or in combination with the thirty-ninth aspect, the coverage extension level is based at least in part on the PSI.

In a forty-first aspect, alone or in combination with one or more of the thirty-ninth through fortieth aspects, the coverage extension level comprises the extended coverage extension level based at least in part on the UE satisfying a range threshold.

In a forty-second aspect, alone or in combination with one or more of the first through forty-first aspects, the selected RACH procedure is selected based at least in part on a priority level of the selected RACH procedure, the priority level of the selected RACH procedure comprises at least one of: a first priority level, or a second priority level that is lower than the first priority level.

In a forty-third aspect, alone or in combination with the forty-second aspect, the priority level of the selected RACH procedure comprises the first priority level based at least in part on the UE being at or near a cell edge.

In a forty-fourth aspect, alone or in combination with one or more of the forty-second through forty-third aspects, the priority level of the selected RACH procedure comprises the first priority level based at least in part on the UE satisfying a velocity threshold.

In a forty-fifth aspect, alone or in combination with one or more of the first through forty-fourth aspects, the selected RACH procedure comprises a four-step RACH procedure having a first priority level that is higher than a second priority level, and process 800 includes receiving, in a message 3, an indication of the first priority level.

In a forty-sixth aspect, alone or in combination with the forty-fifth aspect, the selected RACH procedure is to be prioritized based at least in part on the indication of the first priority level.

In a forty-seventh aspect, alone or in combination with one or more of the first through thirty-sixth aspects, the selected RACH procedure comprises a four-step RACH procedure having a first priority level that is higher than a second priority level, and process 800 includes receiving, in a message 3, an indication of the first priority level based at least in part on a position of the UE relative to one or more cells satisfying a range threshold, wherein the one or more cells comprise a cell associated with the base station, a neighboring cell, or a combination thereof.

In a forty-eighth aspect, alone or in combination with one or more of the first through thirty-sixth aspects, the selected RACH procedure comprises a four-step RACH procedure having a first priority level that is higher than a second priority level, and process 800 includes receiving, in a message 3, an indication of the first priority level based at least in part on a velocity of the UE satisfying a velocity threshold.

In a forty-ninth aspect, alone or in combination with one or more of the first through thirty-sixth aspects, the selected RACH procedure comprises a two-step RACH procedure having a first priority level that is higher than a second priority level, and process 800 includes receiving, in a message A, an indication of the first priority level.

In a fiftieth aspect, alone or in combination with the forty-ninth aspect, process 800 includes prioritizing the selected RACH procedure based at least in part on the indication of the first priority level.

In a fifty-first aspect, alone or in combination with one or more of the first through thirty-sixth aspects, the selected RACH procedure comprises a two-step RACH procedure having a first priority level that is higher than a second priority level, and process 800 includes receiving, in a message A, an indication of the first priority level based at least in part on a position of the UE relative to one or more cells satisfying a range threshold, wherein the one or more cells comprise a cell associated with the base station, a neighboring cell, or a combination thereof.

In a fifty-second aspect, alone or in combination with one or more of the first through thirty-sixth aspects, the selected RACH procedure comprises a two-step RACH procedure having a first priority level that is higher than a second priority level, and process 800 includes receiving, in a message A, an indication of the first priority level based at least in part on a velocity of the UE satisfying a velocity threshold.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: transmitting, to a base station, an indication of a selected random access channel (RACH) procedure that is selected based at least in part on positioning state information (PSI) associated with the UE, wherein the PSI is based at least in part on one or more positioning measurements obtained by the UE; and receiving, from the base station, a configuration of resources for the selected RACH procedure.

Aspect 2: The method of Aspect 1, further comprising obtaining the one or more positioning measurements.

Aspect 3: The method of either of Aspects 1 or 2, further comprising: receiving assisting information from the base station; obtaining the one or more positioning measurements based at least in part on the assisting information; transmitting, to the base station, at least a portion of the PSI; and selecting the selected RACH procedure based at least in part on the PSI.

Aspect 4: The method of any of Aspects 1-3, further comprising: obtaining the one or more positioning measurements; determining the PSI based at least in part on the one or more positioning measurements; and selecting the selected RACH procedure based at least in part on the PSI.

Aspect 5: The method of any of Aspects 1-4, wherein the selected RACH procedure is selected based at least in part on: a capability of the UE, a quality of service requirement, or a combination thereof.

Aspect 6: The method of any of Aspects 1-5, wherein the indication of the selected RACH procedure indicates at least one of: a selected RACH category, a selected RACH type, a selected set of RACH resources, a selected RACH priority, or a combination thereof.

Aspect 7: The method of Aspect 6, wherein the selected RACH category comprises contention free random access (CFRA) or contention based random access (CBRA).

Aspect 8: The method of either of Aspects 6 or 7, wherein the selected RACH type comprises two-step RACH or four-step RACH.

Aspect 9: The method of any of Aspects 6-8, wherein the selected RACH priority comprises a first priority or a second priority that is lower than the first priority.

Aspect 10: The method of any of Aspects 1-9, wherein the UE is in a radio resource control (RRC) connected state, and wherein the selected RACH procedure comprises a contention free random access (CFRA) procedure.

Aspect 11: The method of any of Aspects 1-10, further comprising transmitting, to the base station, a PSI report, comprising one or more PSI elements of a set of PSI elements, and an indication of a capability of the UE associated with the selected RACH procedure.

Aspect 12: The method of Aspect 11, wherein the configuration of resources is based at least in part on at least a portion of the PSI report and a capability of the UE.

Aspect 13: The method of either of Aspects 11 or 12, further comprising: receiving, from the base station, an indication of a set of uplink resources associated with a physical uplink shared channel or a physical uplink control channel, wherein transmitting the PSI report comprises transmitting the PSI report using the set of uplink resources.

Aspect 14: The method of any of Aspects 11-13, further comprising transmitting, to the base station, an indication of a particular payload size for transmitting a subset of PSI elements of the set of PSI elements, wherein the subset of PSI elements comprises fewer than all of the set of PSI elements.

Aspect 15: The method of Aspect 14, wherein the subset of PSI elements comprises one or more radio access technology (RAT)-dependent measurements comprising at least one of: one or more positioning measurements corresponding to a serving cell associated with the base station, one or more positioning measurements associated with one or more neighboring cells, or a combination thereof.

Aspect 16: The method of either of Aspects 14 or 15, wherein the subset of PSI elements comprises one or more radio access technology (RAT)-independent measurements obtained using one or more sensors.

Aspect 17: The method of any of Aspects 11-16, further comprising: determining that the PSI report has a payload size that is greater than a size of a physical uplink shared channel (PUSCH) allocated for transmission of the PSI report, wherein transmitting the PSI report comprises transmitting an initial portion of the PSI report, using the PUSCH, according to a priority level that is higher than a priority level associated with a subsequent transmission of an additional portion of the PSI report.

Aspect 18: The method of Aspect 17, wherein the PSI report comprises measurements associated with a set of selected cells, and wherein the initial portion of the PSI report comprises measurements associated with a subset of the set of selected cells, wherein the subset of the set of selected cells comprises fewer than all of the set of selected cells.

Aspect 19: The method of Aspect 18, wherein the subset of the set of selected cells comprises a serving cell associated with the base station and a neighboring cell.

Aspect 20: The method of any of Aspects 17-19, wherein the configuration of resources is based at least in part on the initial portion of the PSI report.

Aspect 21: The method of any of Aspects 17-20, further comprising transmitting, to the base station, an indication that the PSI report comprises the additional portion of the PSI report.

Aspect 22: The method of any of Aspects 1-21, wherein the configuration of resources is carried in a dedicated radio resource control (RRC) message.

Aspect 23: The method of Aspect 22, wherein the RRC message is addressed to a cell radio network temporary identifier of the UE.

Aspect 24: The method of any of Aspects 1-23, wherein the configuration of resources indicates at least one of: one or more repetitions of an uplink message associated with the selected RACH procedure, one or more repetitions of a downlink message associated with the selected RACH procedure, frequency hopping for the uplink message associated with the selected RACH procedure, frequency hopping for the downlink message associated with the selected RACH procedure, or a combination thereof.

Aspect 25: The method of Aspect 24, wherein the uplink message includes at least one of: a message 1 of a four-step RACH procedure, a message 3 of the four-step RACH procedure, a hybrid automatic repeat request acknowledgment (HARQ-ACK) associated with a message 4 of the four-step RACH procedure, a message A of a two-step RACH procedure, a HARQ-ACK associated with a message B of the two-step RACH procedure, or a combination thereof.

Aspect 26: The method of either of Aspects 24 or 25, wherein the downlink message includes at least one of: a message 2 of a four-step RACH procedure, a message 4 of the four-step RACH procedure, a message B of a two-step RACH procedure, or a combination thereof.

Aspect 27: The method of any of Aspects 1-26, further comprising: performing one or more RACH procedure attempts corresponding to the selected RACH procedure; and maintaining a counter corresponding to a quantity of the one or more RACH procedure attempts.

Aspect 28: The method of Aspect 27, further comprising performing, based at least in part on the counter, at least one of: a preamble retransmission, a power ramping operation, or a combination thereof.

Aspect 29: The method of either of Aspects 27 or 28, wherein the one or more RACH procedure attempts corresponding to the selected RACH procedure comprise no more than a maximum quantity of RACH procedure attempts, wherein a configuration of the maximum quantity of RACH procedure attempts is received from the base station.

Aspect 30: The method of Aspect 29, further comprising: determining that the maximum quantity of RACH procedure attempts have been performed without successfully completing the selected RACH procedure, wherein the selected RACH procedure is associated with a first RACH category and a first RACH type; and performing, based on determining that the maximum quantity of RACH procedure attempts have been performed without successfully completing the selected RACH procedure, at least one of: an additional RACH procedure, wherein the additional RACH procedure is associated with at least one of a second RACH category, a second RACH type, or a combination thereof, a higher coverage extension level, or a combination thereof.

Aspect 31: The method of Aspect 30, wherein the additional RACH procedure comprises at least one of: a prioritized contention based random access procedure, wherein the selected RACH procedure comprises a contention free random access procedure, a two-step RACH procedure, a four-step RACH procedure, or a combination thereof.

Aspect 32: The method of either of Aspects 30 or 31, further comprising: selecting a first RACH preamble for use with the one or more RACH procedure attempts; using an initial transmission power for the one or more RACH procedure attempts; selecting a second RACH preamble for use with the additional RACH procedure; and using, for the additional RACH procedure, at least one of: the initial transmission power, an additional transmission power based at least in part on a power ramping operation, or a combination thereof.

Aspect 33: The method of any of Aspects 29-32, wherein the maximum quantity of RACH procedure attempts is based at least in part on at least one of: a capability of the UE, a coverage corresponding to a cell associated with the base station, a quality of service requirement, or a combination thereof.

Aspect 34: The method of any of Aspects 29-33, wherein the maximum quantity of RACH procedure attempts is based at least in part on at least a portion of the PSI associated with the UE.

Aspect 35: The method of any of Aspects 29-34, wherein the maximum quantity of RACH procedure attempts is based at least in part on at least one of: a position of the UE relative to one or more cells, a velocity of the UE relative to one or more cells, or a combination thereof.

Aspect 36: The method of any of Aspects 29-35, wherein the maximum quantity of RACH procedure attempts comprises: a first value based at least in part on at least one of a first position of the UE relative to one or more cells, a first velocity of the UE relative to the one or more cells, or a combination of both; or a second value based at least in part on at least one of a second position of the UE relative to the one or more cells, a second velocity of the UE relative to the one or more cells, or a combination of both, wherein the first value is higher than the second value based at least in part on: the first position of the UE relative to the one or more cells indicating that the UE is at or near a cell edge, the first velocity of the UE relative to the one or more cells being greater than the second velocity of the UE relative to the one or more cells, or a combination thereof.

Aspect 37: The method of Aspect 36, wherein the one or more cells comprise at least one of: a cell associated with the base station, a neighboring cell, or a combination thereof.

Aspect 38: The method of any of Aspects 1-37, wherein the configuration of resources is based at least in part on a first priority level, corresponding to the UE, relative to a second priority level corresponding to an additional UE, wherein the first priority level and the second priority level are configured using at least one of: a power-ramping factor associated with the selected RACH procedure, a scaling factor associated with the selected RACH procedure, or a combination thereof.

Aspect 39: The method of Aspect 38, wherein the power-ramping factor comprises: a first value, corresponding to the UE, based at least in part on at least one of a position of the UE relative to one or more cells, a velocity of the UE relative to the one or more cells, or a combination of both; and a second value, corresponding to the additional UE, based at least in part on at least one of a position of the additional UE relative to the one or more cells, a velocity of the additional UE relative to the one or more cells, or a combination of both, wherein the first value is higher than the second value based at least in part on: the position of the UE relative to the one or more cells indicating that the UE is closer to a cell edge than the additional UE, the velocity of the UE relative to the one or more cells being greater than the velocity of the additional UE relative to the one or more cells, or a combination thereof.

Aspect 40: The method of either of Aspects 38 or 39, wherein the scaling factor comprises: a first value, corresponding to the UE, based at least in part on at least one of a position of the UE relative to one or more cells, a velocity of the UE relative to the one or more cells, or a combination of both; and a second value, corresponding to the additional UE, based at least in part on at least one of a position of the additional UE relative to the one or more cells, a velocity of the additional UE relative to the one or more cells, or a combination of both, wherein the first value is higher than the second value based at least in part on: the position of the UE relative to the one or more cells indicating that the UE is closer to a cell edge than the additional UE, the velocity of the UE relative to the one or more cells being greater than the velocity of the additional UE relative to the one or more cells, or a combination thereof.

Aspect 41: The method of any of Aspects 1-40, wherein the selected RACH procedure comprises a contention based random access (CBRA) procedure, the CBRA procedure comprising a four-step CBRA procedure or a two-step CBRA procedure.

Aspect 42: The method of Aspect 41, wherein the configuration of resources comprises at least one of: message 1 resources corresponding to the four-step CBRA procedure, or message A resources corresponding to the two-step CBRA procedure.

Aspect 43: The method of either of Aspects 41 or 42, wherein a priority level is associated with the CBRA procedure associated with the UE, wherein the priority level is higher than a priority level of a CBRA procedure associated with another UE, and wherein the configuration of resources comprises, based on the priority level, a plurality of sets of resources, each set of resources of the plurality of sets of resources corresponding to a respective coverage extension level, wherein each set of the plurality of sets of resources comprises at least one of: a dedicated preamble, a dedicated RACH occasion, or a combination thereof.

Aspect 44: The method of any of Aspects 1-43, wherein the configuration of resources is indicated using a system information block.

Aspect 45: The method of any of Aspects 1-44, wherein the selected RACH procedure comprises a four-step RACH procedure or a two-step RACH procedure.

Aspect 46: The method of Aspect 45, further comprising: determining, based at least in part on the PSI, a position of the UE relative to one or more cells, wherein the one or more cells comprise a cell associated with the base station, a neighboring cell, or a combination thereof; determining that the position of the UE indicates that the UE is at or near a cell edge; and selecting the two-step RACH procedure based at least in part on determining that the position of the UE indicates that the UE is at or near the cell edge.

Aspect 47: The method of either of Aspects 45 or 46, further comprising: determining, based at least in part on the PSI, a velocity of the UE relative to one or more cells, wherein the one or more cells comprise a cell associated with the base station, a neighboring cell, or a combination thereof; determining that the velocity of the UE satisfies a velocity threshold; and selecting the two-step RACH procedure based at least in part on determining that the velocity of the UE satisfies the velocity threshold.

Aspect 48: The method of any of Aspects 1-47, wherein the configuration of resources is based at least in part on a coverage extension level, the coverage extension level comprising at least one of: a normal coverage extension level, an extended coverage extension level, or a combination thereof.

Aspect 49: The method of Aspect 48, further comprising selecting the coverage extension level based at least in part on the PSI.

Aspect 50: The method of either of Aspects 48 or 49, further comprising: determining, based at least in part on the PSI, a position of the UE relative to one or more cells, wherein the one or more cells comprise a cell associated with the base station, a neighboring cell, or a combination thereof; determining that the position of the UE satisfies a range threshold; and selecting the extended coverage extension level based at least in part on determining that the position of the UE satisfies the range threshold.

Aspect 51: The method of any of Aspects 1-50, wherein the selected RACH procedure is selected based at least in part on a priority level of the selected RACH procedure, wherein the priority level of the selected RACH procedure comprises at least one of: a first priority level, or a second priority level that is lower than the first priority level.

Aspect 52: The method of Aspect 51, further comprising: determining, based at least in part on the PSI, a position of the UE relative to one or more cells, wherein the one or more cells comprise a cell associated with the base station, a neighboring cell, or a combination thereof; determining that the position of the UE indicates that the UE is at or near a cell edge; and selecting the first priority level based at least in part on determining that the position of the UE indicates that the UE is at or near the cell edge.

Aspect 53: The method of either of Aspects 51 or 52, further comprising: determining, based at least in part on the PSI, a velocity of the UE relative to one or more cells, wherein the one or more cells comprise a cell associated with the base station, a neighboring cell, or a combination thereof; determining that the velocity of the UE satisfies a velocity threshold; and selecting the first priority level based at least in part on determining that the velocity of the UE satisfies the velocity threshold.

Aspect 54: The method of any of Aspects 1-45, wherein the selected RACH procedure comprises a four-step RACH procedure having a first priority level that is higher than a second priority level, the method further comprising: transmitting, in a message 3, an indication of the first priority level.

Aspect 55: The method of Aspect 54, wherein the selected RACH procedure is to be prioritized based at least in part on the indication of the first priority level.

Aspect 56: The method of any of Aspects 1-45, wherein the selected RACH procedure comprises a four-step RACH procedure having a first priority level that is higher than a second priority level, the method further comprising: determining, based at least in part on the PSI, a position of the UE relative to one or more cells, wherein the one or more cells comprise a cell associated with the base station, a neighboring cell, or a combination thereof; and determining that the position of the UE satisfies a range threshold; and transmitting, in a message 3, an indication of the first priority level based at least in part on determining that the position of the UE satisfies the range threshold.

Aspect 57: The method of any of Aspects 1-45, wherein the selected RACH procedure comprises a four-step RACH procedure having a first priority level that is higher than a second priority level, the method further comprising: determining, based at least in part on the PSI, a velocity of the UE relative to one or more cells, wherein the one or more cells comprise a cell associated with the base station, a neighboring cell, or a combination thereof; determining that the velocity of the UE satisfies a velocity threshold; and transmitting, in a message 3, an indication of the first priority level based at least in part on determining that the velocity of the UE satisfies the velocity threshold.

Aspect 58: The method of any of Aspects 1-45, wherein the selected RACH procedure comprises a two-step RACH procedure having a first priority level that is higher than a second priority level, the method further comprising: transmitting, in a message A, an indication of the first priority level.

Aspect 59: The method of Aspect 58, wherein the selected RACH procedure is to be prioritized based at least in part on the indication of the first priority level.

Aspect 60: The method of any of Aspects 1-45, wherein the selected RACH procedure comprises a two-step RACH procedure having a first priority level that is higher than a second priority level, the method further comprising: determining, based at least in part on the PSI, a position of the UE relative to one or more cells, wherein the one or more cells comprise a cell associated with the base station, a neighboring cell, or a combination thereof; determining that the position of the UE satisfies a range threshold; and transmitting, in a message A, an indication of the first priority level based at least in part on determining that the position of the UE satisfies the range threshold.

Aspect 61: The method of any of Aspects 1-45, wherein the selected RACH procedure comprises a two-step RACH procedure having a first priority level that is higher than a second priority level, the method further comprising: determining, based at least in part on the PSI, a velocity of the UE relative to one or more cells, wherein the one or more cells comprise a cell associated with the base station, a neighboring cell, or a combination thereof; determining that the velocity of the UE satisfies a velocity threshold; and transmitting, in a message A, an indication of the first priority level based at least in part on determining that the velocity of the UE satisfies the velocity threshold.

Aspect 62: A method of wireless communication performed by a base station, comprising: receiving, from a user equipment (UE), an indication of a selected random access channel (RACH) procedure that is based at least in part on positioning state information (PSI) associated with the UE, wherein the PSI is based at least in part on one or more positioning measurements obtained by the UE; and transmitting, to the UE, a configuration of resources for the selected RACH procedure.

Aspect 63: The method of Aspect 62, further comprising: transmitting assisting information to the UE; and receiving, from the UE, at least a portion of the PSI, wherein the PSI comprises one or more positioning measurements based at least in part on the assisting information.

Aspect 64: The method of either of Aspects 62 or 63, wherein the selected RACH procedure is selected based at least in part on: a capability of the UE, a quality of service requirement, or a combination thereof.

Aspect 65: The method of any of Aspects 62-64, wherein the indication of the selected RACH procedure indicates at least one of: a selected RACH category, a selected RACH type, a selected set of RACH resources, a selected RACH priority, or a combination thereof.

Aspect 66: The method of Aspect 65, wherein the selected RACH category comprises contention free random access (CFRA) or contention based random access (CBRA).

Aspect 67: The method of either of Aspects 65 or 66, wherein the selected RACH type comprises two-step RACH or four-step RACH.

Aspect 68: The method of any of Aspects 65-67, wherein the selected RACH priority comprises a first priority or a second priority that is lower than the first priority.

Aspect 69: The method of any of Aspects 62-68, wherein the UE is in a radio resource control (RRC) connected state, and wherein the selected RACH procedure comprises a contention free random access (CFRA) procedure.

Aspect 70: The method of any of Aspects 62-69, further comprising receiving, from the UE, a PSI report, comprising one or more PSI elements of a set of PSI elements, and an indication of a capability of the UE associated with the selected RACH procedure.

Aspect 71: The method of Aspect 70, wherein the configuration of resources is based at least in part on at least a portion of the PSI report and a capability of the UE.

Aspect 72: The method of either of Aspects 70 or 71, further comprising: transmitting, to the UE, an indication of a set of uplink resources associated with a physical uplink shared channel or a physical uplink control channel, wherein the PSI report is transmitted using the set of uplink resources.

Aspect 73: The method of any of Aspects 70-72, further comprising receiving, from the UE, an indication of a particular payload size for transmitting a subset of PSI elements of the set of PSI elements, wherein the subset of PSI elements comprises fewer than all of the set of PSI elements.

Aspect 74: The method of Aspect 73, wherein the subset of PSI elements comprises one or more radio access technology (RAT)-dependent measurements comprising at least one of: one or more positioning measurements corresponding to a serving cell associated with the base station, one or more positioning measurements associated with one or more neighboring cells, or a combination thereof.

Aspect 75: The method of either of Aspects 73 or 74, wherein the subset of PSI elements comprises one or more radio access technology (RAT)-independent measurements obtained using one or more sensors.

Aspect 76: The method of any of Aspects 70-75, wherein the PSI report has a payload size that is greater than a size of a physical uplink shared channel (PUSCH) allocated for transmission of the PSI report, and wherein receiving the PSI report comprises receiving an initial portion of the PSI report, using the PUSCH, according to a priority level that is higher than a priority level associated with a subsequent receipt of an additional portion of the PSI report.

Aspect 77: The method of Aspect 76, wherein the PSI report comprises measurements associated with a set of selected cells, and wherein the initial portion of the PSI report comprises measurements associated with a subset of the set of selected cells, wherein the subset of the set of selected cells comprises fewer than all of the set of selected cells.

Aspect 78: The method of Aspect 77, wherein the subset of the set of selected cells comprises a serving cell associated with the base station and a neighboring cell.

Aspect 79: The method of any of Aspects 76-78, wherein the configuration of resources is based at least in part on the initial portion of the PSI report.

Aspect 80: The method of any of Aspects 76-79, further comprising receiving, from the UE, an indication that the PSI report comprises the additional portion of the PSI report.

Aspect 81: The method of any of Aspects 62-80, wherein the configuration of resources is carried in a dedicated radio resource control (RRC) message.

Aspect 82: The method of Aspect 81, wherein the RRC message is addressed to a cell radio network temporary identifier of the UE.

Aspect 83: The method of any of Aspects 62-82, wherein the configuration of resources indicates at least one of: one or more repetitions of an uplink message associated with the selected RACH procedure, one or more repetitions of a downlink message associated with the selected RACH procedure, frequency hopping for the uplink message associated with the selected RACH procedure, frequency hopping for the downlink message associated with the selected RACH procedure, or a combination thereof.

Aspect 84: The method of Aspect 83, wherein the uplink message includes at least one of: a message 1 of a four-step RACH procedure, a message 3 of the four-step RACH procedure, a hybrid automatic repeat request acknowledgment (HARQ-ACK) associated with a message 4 of the four-step RACH procedure, a message A of a two-step RACH procedure, a HARQ-ACK associated with a message B of the two-step RACH procedure, or a combination thereof.

Aspect 85: The method of either of Aspects 83 or 84, wherein the downlink message includes at least one of: a message 2 of a four-step RACH procedure, a message 4 of the four-step RACH procedure, a message B of a two-step RACH procedure, or a combination thereof.

Aspect 86: The method of any of Aspects 62-85, further comprising transmitting, to the UE, a configuration of a maximum quantity of RACH procedure attempts corresponding to the selected RACH procedure.

Aspect 87: The method of Aspect 86, wherein the maximum quantity of RACH procedure attempts is based at least in part on at least a portion of the PSI associated with the UE.

Aspect 88: The method of either of Aspects 86 or 87, wherein the maximum quantity of RACH procedure attempts is based at least in part on at least one of: a position of the UE relative to one or more cells, a velocity of the UE relative to one or more cells, or a combination thereof.

Aspect 89: The method of any of Aspects 86-88, wherein the maximum quantity of RACH procedure attempts comprises: a first value based at least in part on at least one of a first position of the UE relative to one or more cells, a first velocity of the UE relative to the one or more cells, or a combination of both; or a second value based at least in part on at least one of a second position of the UE relative to the one or more cells, a second velocity of the UE relative to the one or more cells, or a combination of both, wherein the first value is higher than the second value based at least in part on: the first position of the UE relative to the one or more cells indicating that the UE is at or near a cell edge, the first velocity of the UE relative to the one or more cells being greater than the second velocity of the UE relative to the one or more cells, or a combination thereof.

Aspect 90: The method of Aspect 89, wherein the one or more cells comprise at least one of: a cell associated with the base station, a neighboring cell, or a combination thereof.

Aspect 91: The method of any of Aspects 62-90, wherein the configuration of resources is based at least in part on a first priority level, corresponding to the UE, relative to a second priority level corresponding to an additional UE, wherein the first priority level and the second priority level are configured using at least one of: a power-ramping factor associated with the selected RACH procedure, a scaling factor associated with the selected RACH procedure, or a combination thereof.

Aspect 92: The method of Aspect 91, wherein the power-ramping factor comprises: a first value, corresponding to the UE, based at least in part on at least one of a position of the UE relative to one or more cells, a velocity of the UE relative to the one or more cells, or a combination of both; and a second value, corresponding to the additional UE, based at least in part on at least one of a position of the additional UE relative to the one or more cells, a velocity of the additional UE relative to the one or more cells, or a combination of both, wherein the first value is higher than the second value based at least in part on: the position of the UE relative to the one or more cells indicating that the UE is closer to a cell edge than the additional UE, the velocity of the UE relative to the one or more cells being greater than the velocity of the additional UE relative to the one or more cells, or a combination thereof.

Aspect 93: The method of either of Aspects 91 or 92, wherein the scaling factor comprises: a first value, corresponding to the UE, based at least in part on at least one of a position of the UE relative to one or more cells, a velocity of the UE relative to the one or more cells, or a combination of both; and a second value, corresponding to the additional UE, based at least in part on at least one of a position of the additional UE relative to the one or more cells, a velocity of the additional UE relative to the one or more cells, or a combination of both, wherein the first value is higher than the second value based at least in part on: the position of the UE relative to the one or more cells indicating that the UE is closer to a cell edge than the additional UE, the velocity of the UE relative to the one or more cells being greater than the velocity of the additional UE relative to the one or more cells, or a combination thereof.

Aspect 94: The method of any of Aspects 62-93, wherein the selected RACH procedure comprises a contention based random access (CBRA) procedure, the CBRA procedure comprising a four-step CBRA procedure or a two-step CBRA procedure.

Aspect 95: The method of Aspect 94, wherein the configuration of resources comprises at least one of: message 1 resources corresponding to the four-step CBRA procedure, or message A resources corresponding to the two-step CBRA procedure.

Aspect 96: The method of either of Aspects 94 or 95, wherein a priority level is associated with the CBRA procedure associated with the UE, wherein the priority level is higher than a priority level of a CBRA procedure associated with another UE, and wherein the configuration of resources comprises, based at least in part on the priority level, a plurality of sets of resources, each set of resources of the plurality of sets of resources corresponding to a respective coverage extension level, wherein each set of the plurality of sets of resources comprises at least one of: a dedicated preamble, a dedicated RACH occasion, or a combination thereof.

Aspect 97: The method of any of Aspects 62-96, wherein the configuration of resources is indicated using a system information block.

Aspect 98: The method of any of Aspects 62-97, wherein the selected RACH procedure comprises a four-step RACH procedure or a two-step RACH procedure.

Aspect 99: The method of Aspect 98, wherein the selected RACH procedure comprises the two-step RACH procedure based at least in part on the UE being at or near a cell edge.

Aspect 100: The method of either of Aspects 98 or 99, wherein the selected RACH procedure comprises the two-step RACH procedure based at least in part on a velocity of the UE satisfying a velocity threshold.

Aspect 101: The method of any of Aspects 62-100, wherein the configuration of resources is based at least in part on a coverage extension level, the coverage extension level comprising at least one of: a normal coverage extension level, an extended coverage extension level, or a combination thereof.

Aspect 102: The method of Aspect 101, wherein the coverage extension level is based at least in part on the PSI.

Aspect 103: The method of either of Aspects 101 or 102, wherein the coverage extension level comprises the extended coverage extension level based at least in part on the UE satisfying a range threshold.

Aspect 104: The method of any of Aspects 62-103, wherein the selected RACH procedure is selected based at least in part on a priority level of the selected RACH procedure, wherein the priority level of the selected RACH procedure comprises at least one of: a first priority level, or a second priority level that is lower than the first priority level.

Aspect 105: The method of Aspect 104, wherein the priority level of the selected RACH procedure comprises the first priority level based at least in part on the UE being at or near a cell edge.

Aspect 106: The method of either of Aspects 104 or 105, wherein the priority level of the selected RACH procedure comprises the first priority level based at least in part on the UE satisfying a velocity threshold.

Aspect 107: The method of any of Aspects 62-98, wherein the selected RACH procedure comprises a four-step RACH procedure having a first priority level that is higher than a second priority level, the method further comprising: receiving, in a message 3, an indication of the first priority level.

Aspect 108: The method of Aspect 107, wherein the selected RACH procedure is to be prioritized based at least in part on the indication of the first priority level.

Aspect 109: The method of any of Aspects 62-98, wherein the selected RACH procedure comprises a four-step RACH procedure having a first priority level that is higher than a second priority level, the method further comprising: receiving, in a message 3, an indication of the first priority level based at least in part on a position of the UE relative to one or more cells satisfying a range threshold, wherein the one or more cells comprise a cell associated with the base station, a neighboring cell, or a combination thereof.

Aspect 110: The method of any of Aspects 62-98, wherein the selected RACH procedure comprises a four-step RACH procedure having a first priority level that is higher than a second priority level, the method further comprising: receiving, in a message 3, an indication of the first priority level based at least in part on a velocity of the UE satisfying a velocity threshold.

Aspect 111: The method of any of Aspects 62-98, wherein the selected RACH procedure comprises a two-step RACH procedure having a first priority level that is higher than a second priority level, the method further comprising: receiving, in a message A, an indication of the first priority level.

Aspect 112: The method of Aspect 111, further comprising prioritizing the selected RACH procedure based at least in part on the indication of the first priority level.

Aspect 113: The method of any of Aspects 62-98, wherein the selected RACH procedure comprises a two-step RACH procedure having a first priority level that is higher than a second priority level, the method further comprising: receiving, in a message A, an indication of the first priority level based at least in part on a position of the UE relative to one or more cells satisfying a range threshold, wherein the one or more cells comprise a cell associated with the base station, a neighboring cell, or a combination thereof.

Aspect 114: The method of any of Aspects 62-98, wherein the selected RACH procedure comprises a two-step RACH procedure having a first priority level that is higher than a second priority level, the method further comprising: receiving, in a message A, an indication of the first priority level based at least in part on a velocity of the UE satisfying a velocity threshold.

Aspect 115: An apparatus for wireless communication at a device, comprising a processor; memory coupled with the processor; and instructions stored in the memory and executable by the processor to cause the apparatus to perform the method of one or more Aspects of Aspects 1-61.

Aspect 116: A device for wireless communication, comprising a memory and one or more processors coupled to the memory, the memory and the one or more processors configured to perform the method of one or more Aspects of Aspects 1-61.

Aspect 117: An apparatus for wireless communication, comprising at least one means for performing the method of one or more Aspects of Aspects 1-61.

Aspect 118: A non-transitory computer-readable medium storing code for wireless communication, the code comprising instructions executable by a processor to perform the method of one or more Aspects of Aspects 1-61.

Aspect 119: A non-transitory computer-readable medium storing a set of instructions for wireless communication, the set of instructions comprising one or more instructions that, when executed by one or more processors of a device, cause the device to perform the method of one or more Aspects of Aspects 1-61.

Aspect 120: An apparatus for wireless communication at a device, comprising a processor; memory coupled with the processor; and instructions stored in the memory and executable by the processor to cause the apparatus to perform the method of one or more Aspects of Aspects 62-114.

Aspect 121: A device for wireless communication, comprising a memory and one or more processors coupled to the memory, the memory and the one or more processors configured to perform the method of one or more Aspects of Aspects 62-114.

Aspect 122: An apparatus for wireless communication, comprising at least one means for performing the method of one or more Aspects of Aspects 62-114.

Aspect 123: A non-transitory computer-readable medium storing code for wireless communication, the code comprising instructions executable by a processor to perform the method of one or more Aspects of Aspects 62-114.

Aspect 124: A non-transitory computer-readable medium storing a set of instructions for wireless communication, the set of instructions comprising one or more instructions that, when executed by one or more processors of a device, cause the device to perform the method of one or more Aspects of Aspects 62-114.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      transmit, to a base station, an indication of a selected random access channel (RACH) procedure that is selected based at least in part on positioning state information (PSI) associated with the UE, wherein the PSI is based at least in part on one or more positioning measurements obtained by the UE; and
      receive, from the base station, a configuration of resources for the selected RACH procedure.

2. The UE of claim 1, wherein the one or more processors are further configured to obtain the one or more positioning measurements.

3. The UE of claim 1, wherein the one or more processors are further configured to:
   receive assisting information from the base station;
   obtain the one or more positioning measurements based at least in part on the assisting information;
   transmit, to the base station, at least a portion of the PSI; and
   select the selected RACH procedure based at least in part on the PSI.

4. The UE of claim 1, wherein the one or more processors are further configured to:
   obtain the one or more positioning measurements;
   determine the PSI based at least in part on the one or more positioning measurements; and
   select the selected RACH procedure based at least in part on the PSI.

5. The UE of claim 1, wherein the selected RACH procedure is selected based at least in part on:
   a capability of the UE,
   a quality of service requirement, or
   a combination thereof.

6. The UE of claim 1, wherein the indication of the selected RACH procedure indicates at least one of:
   a selected RACH category, wherein the selected RACH category comprises contention free random access (CFRA) or contention based random access (CBRA),
   a selected RACH type, wherein the selected RACH type comprises two-step RACH or four-step RACH,
   a selected set of RACH resources,
   a selected RACH priority, wherein the selected RACH priority comprises a first priority or a second priority that is lower than the first priority, or
   a combination thereof.

7. The UE of claim 1, wherein the UE is in a radio resource control (RRC) connected state, and wherein the selected RACH procedure comprises a contention free random access (CFRA) procedure.

8. The UE of claim 1, wherein the one or more processors are further configured to transmit, to the base station, a PSI report, comprising one or more PSI elements of a set of PSI elements, and an indication of a capability of the UE associated with the selected RACH procedure.

9. The UE of claim 8, wherein the configuration of resources is based at least in part on at least a portion of the PSI report and a capability of the UE.

10. The UE of claim 8, wherein the one or more processors are further configured to:
receive, from the base station, an indication of a set of uplink resources associated with a physical uplink shared channel or a physical uplink control channel, wherein the one or more processors, to transmit the PSI report, are configured to transmit the PSI report using the set of uplink resources.

11. The UE of claim 8, wherein the one or more processors are further configured to transmit, to the base station, an indication of a particular payload size for transmitting a subset of PSI elements of the set of PSI elements, wherein the subset of PSI elements comprises fewer than all of the set of PSI elements.

12. The UE of claim 11, wherein the subset of PSI elements comprises one or more radio access technology (RAT)-independent measurements obtained using one or more sensors, or one or more radio access technology (RAT)-dependent measurements comprising at least one of:
one or more positioning measurements corresponding to a serving cell associated with the base station,
one or more positioning measurements associated with one or more neighboring cells, or a combination thereof.

13. The UE of claim 11, wherein the one or more processors are further configured to:
determine that the PSI report has a payload size that is greater than a size of a physical uplink shared channel (PUSCH) allocated for transmission of the PSI report, wherein the one or more processors, to transmit the PSI report, are configured to transmit an initial portion of the PSI report, using the PUSCH, according to a priority level that is higher than a priority level associated with a subsequent transmission of an additional portion of the PSI report.

14. The UE of claim 13, wherein the configuration of resources is based at least in part on the initial portion of the PSI report.

15. The UE of claim 13, wherein the one or more processors are further configured to transmit, to the base station, an indication that the PSI report comprises the additional portion of the PSI report.

16. The UE of claim 1, wherein the configuration of resources indicates at least one of:
one or more repetitions of an uplink message associated with the selected RACH procedure,
one or more repetitions of a downlink message associated with the selected RACH procedure,
frequency hopping for the uplink message associated with the selected RACH procedure,
frequency hopping for the downlink message associated with the selected RACH procedure, or
a combination thereof.

17. The UE of claim 16, wherein the uplink message includes at least one of:
a message 1 of a four-step RACH procedure,
a message 3 of the four-step RACH procedure,
a hybrid automatic repeat request acknowledgment (HARQ-ACK) associated with a message 4 of the four-step RACH procedure,
a message A of a two-step RACH procedure,
a HARQ-ACK associated with a message B of the two-step RACH procedure, or
a combination thereof.

18. The UE of claim 16, wherein the downlink message includes at least one of:
a message 2 of a four-step RACH procedure,
a message 4 of the four-step RACH procedure,
a message B of a two-step RACH procedure, or
a combination thereof.

19. The UE of claim 1, wherein the one or more processors are further configured to:
perform one or more RACH procedure attempts corresponding to the selected RACH procedure; and
maintain a counter corresponding to a quantity of the one or more RACH procedure attempts.

20. The UE of claim 19, wherein the one or more processors are further configured to perform, based at least in part on the counter, at least one of:
a preamble retransmission,
a power ramping operation, or
a combination thereof.

21. The UE of claim 1, wherein the configuration of resources is based at least in part on a first priority level, corresponding to the UE, relative to a second priority level corresponding to an additional UE, wherein the first priority level and the second priority level are configured using at least one of:
a power-ramping factor associated with the selected RACH procedure,
a scaling factor associated with the selected RACH procedure, or
a combination thereof.

22. The UE of claim 1, wherein the selected RACH procedure comprises a contention based random access (CBRA) procedure, the CBRA procedure comprising a four-step CBRA procedure or a two-step CBRA procedure, wherein the configuration of resources comprises at least one of:
message 1 resources corresponding to the four-step CBRA procedure, or
message A resources corresponding to the two-step CBRA procedure.

23. The UE of claim 22, wherein a priority level is associated with the CBRA procedure associated with the UE, wherein the priority level is higher than a priority level of a CBRA procedure associated with another UE, and wherein the configuration of resources comprises, based on the priority level, a plurality of sets of resources, each set of resources of the plurality of sets of resources corresponding to a respective coverage extension level, wherein each set of the plurality of sets of resources comprises at least one of:
a dedicated preamble,
a dedicated RACH occasion, or
a combination thereof.

24. The UE of claim 1, wherein the selected RACH procedure comprises a four-step RACH procedure or a two-step RACH procedure.

25. The UE of claim 1, wherein the configuration of resources is based at least in part on a coverage extension level, the coverage extension level comprising at least one of:
a normal coverage extension level,
an extended coverage extension level, or
a combination thereof.

26. The UE of claim 1, wherein the selected RACH procedure is selected based at least in part on a priority level of the selected RACH procedure, wherein the priority level of the selected RACH procedure comprises at least one of:
   a first priority level, or
   a second priority level that is lower than the first priority level.

27. The UE of claim 1, wherein the selected RACH procedure comprises a four-step RACH procedure having a first priority level that is higher than a second priority level, the one or more processors configured to:
   transmit, in a message 3, an indication of the first priority level, wherein the selected RACH procedure is to be prioritized based at least in part on the indication of the first priority level.

28. The UE of claim 1, wherein the selected RACH procedure comprises a two-step RACH procedure having a first priority level that is higher than a second priority level, the one or more processors configured to:
   transmit, in a message A, an indication of the first priority level, wherein the selected RACH procedure is to be prioritized based at least in part on the indication of the first priority level.

29. A method of wireless communication performed by a user equipment (UE), comprising:
   transmitting, to a base station, an indication of a selected random access channel (RACH) procedure that is selected based at least in part on positioning state information (PSI) associated with the UE, wherein the PSI is based at least in part on one or more positioning measurements obtained by the UE; and
   receiving, from the base station, a configuration of resources for the selected RACH procedure.

30. A method of wireless communication performed by a base station, comprising:
   receiving, from a user equipment (UE), an indication of a selected random access channel (RACH) procedure that is based at least in part on positioning state information (PSI) associated with the UE, wherein the PSI is based at least in part on one or more positioning measurements obtained by the UE; and
   transmitting, to the UE, a configuration of resources for the selected RACH procedure.

\* \* \* \* \*